(12) United States Patent
Hinohara et al.

(10) Patent No.: US 9,509,861 B2
(45) Date of Patent: Nov. 29, 2016

(54) COMMUNICATION TERMINAL, COMMUNICATION METHOD, AND RECORDING MEDIUM STORING COMMUNICATION CONTROL PROGRAM

(71) Applicants: Hiroshi Hinohara, Kanagawa (JP); Hiroyuki Kanda, Kanagawa (JP); Kenji Tanaka, Tokyo (JP); Takahiro Asai, Kanagawa (JP)

(72) Inventors: Hiroshi Hinohara, Kanagawa (JP); Hiroyuki Kanda, Kanagawa (JP); Kenji Tanaka, Tokyo (JP); Takahiro Asai, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 478 days.

(21) Appl. No.: 14/185,051

(22) Filed: Feb. 20, 2014

(65) Prior Publication Data
US 2014/0240441 A1  Aug. 28, 2014

(30) Foreign Application Priority Data
Feb. 28, 2013 (JP) .................. 2013-039673

(51) Int. Cl.
| H04N 7/14 | (2006.01) |
| H04N 1/00 | (2006.01) |
| H04L 29/06 | (2006.01) |
| H04L 12/58 | (2006.01) |

(52) U.S. Cl.
CPC ........ *H04N 1/00228* (2013.01); *H04L 51/046* (2013.01); *H04L 51/10* (2013.01); *H04L 65/4038* (2013.01); *H04N 1/00233* (2013.01); *H04N 1/00299* (2013.01); *H04N 7/147* (2013.01); *H04N 2201/0082* (2013.01); *H04N 2201/0091* (2013.01); *H04N 2201/0093* (2013.01); *H04N 2201/0094* (2013.01)

(58) Field of Classification Search
CPC ........................................... H04N 7/14
USPC ............... 348/14.01, 14.03, 14.04, 14.05
See application file for complete search history.

(56) References Cited

U.S. PATENT DOCUMENTS

| 8,848,885 B2 * | 9/2014 | Numano ............ H04N 7/147 379/201.1 |
| 2011/0219060 A1 | 9/2011 | Ohwada |
| 2013/0222528 A1 | 8/2013 | Hinohara et al. |

FOREIGN PATENT DOCUMENTS

| JP | 2008-227577 | 9/2008 |
| JP | 2011-205612 | 10/2011 |
| WO | WO2008/117116 A2 | 10/2008 |

* cited by examiner

*Primary Examiner* — Olisa Anwah
(74) *Attorney, Agent, or Firm* — Oblon, McClelland, Maier & Neustadt, L.L.P.

(57) ABSTRACT

Example embodiments of the present invention include a communication terminal, a communication method, and a communication control program stored on a non-transitory recording medium, each of which is capable of communicating with a counterpart terminal via a network. While communicating with a counterpart communication terminal being a first counterpart terminal, the communication terminal displays, on a display, second-terminal-specific information regarding an image forming apparatus as a candidate of a second counterpart terminal. In response to a user instruction that selects the image forming apparatus as the second counterpart terminal, the communication terminal communicates with the selected image forming apparatus to transmit image data to the selected image forming apparatus through the network.

14 Claims, 25 Drawing Sheets

FIG. 9

VISUAL INFORMATION MANAGEMENT TABLE

| TYPE | OPERATION STATE | VISUAL INFORMATION (ICON) |
|---|---|---|
| COMMUNICATION TERMINAL | ONLINE (COMMUNICATION OK) | |
| COMMUNICATION TERMINAL | ONLINE (COMMUNICATING) | |
| COMMUNICATION TERMINAL | ONLINE (INTERRUPT) | |
| COMMUNICATION TERMINAL | OFFLINE | |
| IMAGE FORMING APPARATUS | ONLINE | |
| IMAGE FORMING APPARATUS | OFFLINE | |

FIG. 10

RELAY DEVICE MANAGEMENT TABLE

| RELAY DEVICE ID | OPERATION STATE | DATE AND TIME RECEIVED | RELAY DEVICE IP ADDRESS | MAXIMUM DATA TRANSMISSION SPEED (Mbps) |
|---|---|---|---|---|
| 111a | ON LINE | 2013.02.10.13:42 | 1.2.1.2 | 100 |
| 111b | ON LINE | 2013.02.11.12:05 | 1.2.2.2 | 1000 |
| 111c | OFF LINE | 2013.02.10.17:33 | 1.3.1.2 | 10 |
| 111d | OFF LINE | 2013.02.10.09:02 | 1.3.2.2 | 10 |

FIG. 11

TERMINAL AUTHENTICATION MANAGEMENT TABLE

| TERMINAL ID | PASSWORD |
|---|---|
| 01aa | aaaa |
| 01ab | abab |
| 01ac | acac |
| ... | ... |

FIG. 12

TERMINAL STATE MANAGEMENT TABLE

| TERMINAL ID | TYPE | TERMINAL NAME | OPERATION STATE | DATE AND TIME RECEIVED | TERMINAL IP ADDRESS |
|---|---|---|---|---|---|
| 01aa | COMMUNICATION TERMINAL | JAPAN TOKYO OFFICE AA TERMINAL | ONLINE (COMMUNICATION OK) | 2013.02.10.13:40 | 1.2.1.3 |
| 01ab | COMMUNICATION TERMINAL | JAPAN TOKYO OFFICE AB TERMINAL | ONLINE (INTERRUPT) | 2013.02.11.12:00 | 1.2.1.4 |
| 02aa | IMAGE FORMING APPARATUS | JAPAN TOKYO OFFICE AC TERMINAL | OFFLINE | 2013.02.09.17:30 | 1.2.1.5 |
| ... | ... | ... | ... | ... | ... |
| 01da | COMMUNICATION TERMINAL | U.S. WASH, D.C. OFFICE DA TERMINAL | ONLINE (COMMUNICATION OK) | 2013.12.10.12:41 | 1.3.2.3 |
| 01db | COMMUNICATION TERMINAL | U.S. WASH, D.C. OFFICE DB TERMINAL | ONLINE (COMMUNICATING) | 2013.02.10.13:30 | 1.3.2.4 |
| 01da | IMAGE FORMING APPARATUS | U.S. WASH, D.C. OFFICE DC TERMINAL | ONLINE | 2013.02.10.09:00 | 1.3.2.5 |
| ... | ... | ... | ... | ... | ... |

FIG. 13

CANDIDATE LIST MANAGEMENT TABLE

| REQUEST TERMINAL ID | COUNTERPART TERMINAL ID |
|---|---|
| 01aa | 01ab,···,01ba,···,01bb,···,01ca,01cb,01da,02da |
| ... | ... |
| 01ba | 01aa,01ab,01ca,01cb,01da,01db |
| ... | ... |
| 01ca | 01aa,01ab,01ba,···,01da,01ca,···,01da |
| ... | ... |

FIG. 14

SESSION MANAGEMENT TABLE

| RELAY DEVICE ID | REQUEST TERMINAL ID | COUNTERPART TERMINAL ID | DELAY TIME (ms) | DATE AND TIME RECEIVED |
|---|---|---|---|---|
| 111a | 01aa | 01ca | 200 | 2013.02.10.13:50 |
| 111b | 01ba | 01cb | 50 | 2013.02.11.12:05 |
| 111c | 01bb | 01cc | 400 | 2013.02.10.17:35 |
| ... | ... | ... | ... | ... |

COMMUNICATION TERMINAL, COMMUNICATION METHOD, AND RECORDING MEDIUM STORING COMMUNICATION CONTROL PROGRAM

CROSS-REFERENCE TO RELATED APPLICATIONS

This patent application is based on and claims priority pursuant to 35 U.S.C. §119 to Japanese Patent Application No. 2013-039673, filed on Feb. 28, 2013, in the Japan Patent Office, the entire disclosure of which is hereby incorporated by reference herein.

BACKGROUND

Technical Field

The present invention generally relates to a communication terminal, a communication method, and a communication control program stored on a non-transitory recording medium, each of which is capable of communicating with a counterpart terminal via a network.

Description of the Related Art

With the need for reducing costs or times associated with business trips, communication systems provided with teleconference or videoconference ("conference") capabilities are widely used. The communication systems allow transmission of contents data such as image data and/or sound data among a plurality of communication terminals that are remotely located from one another to facilitate communication among the plurality of communication terminals through a communications network such as the Internet.

While communication takes place among the plurality of communication terminals, data such as presentation material data may be transmitted from the communication terminal at one end to the communication terminal at the other end. In such case, the user at one end usually sends the presentation material data through a personal computer by email to a personal computer of the user at the other end. This may interrupt smooth communication among the users through the communication terminals, as the user at one end needs to prepare to transmit the presentation material data through the personal computer.

SUMMARY

Example embodiments of the present invention include a communication terminal, a communication method, and a communication control program stored on a non-transitory recording medium, each of which is capable of communicating with a counterpart terminal via a network. While communicating with a counterpart communication terminal being a first counterpart terminal, the communication terminal displays, on a display, second-terminal-specific information regarding an image forming apparatus as a candidate of a second counterpart terminal. In response to a user instruction that selects the image forming apparatus as the second counterpart terminal, the communication terminal communicates with the selected image forming apparatus to transmit image data to the selected image forming apparatus through the network.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is an example data structure of a visual information management table, managed by the communication terminal of FIG. 8;

FIG. 10 is an example data structure of a relay device management table, managed by the management system of FIG. 8;

FIG. 11 is an example data structure of a terminal authentication management table, managed by the management system of FIG. 8;

FIG. 12 is an example data structure of a terminal state management table, managed by the management system of FIG. 8;

FIG. 13 is an example data structure of a candidate list management table, managed by the management system of FIG. 8;

FIG. 14 is an example data structure of a session management table, managed by the management system of FIG. 8;

Figure 1:
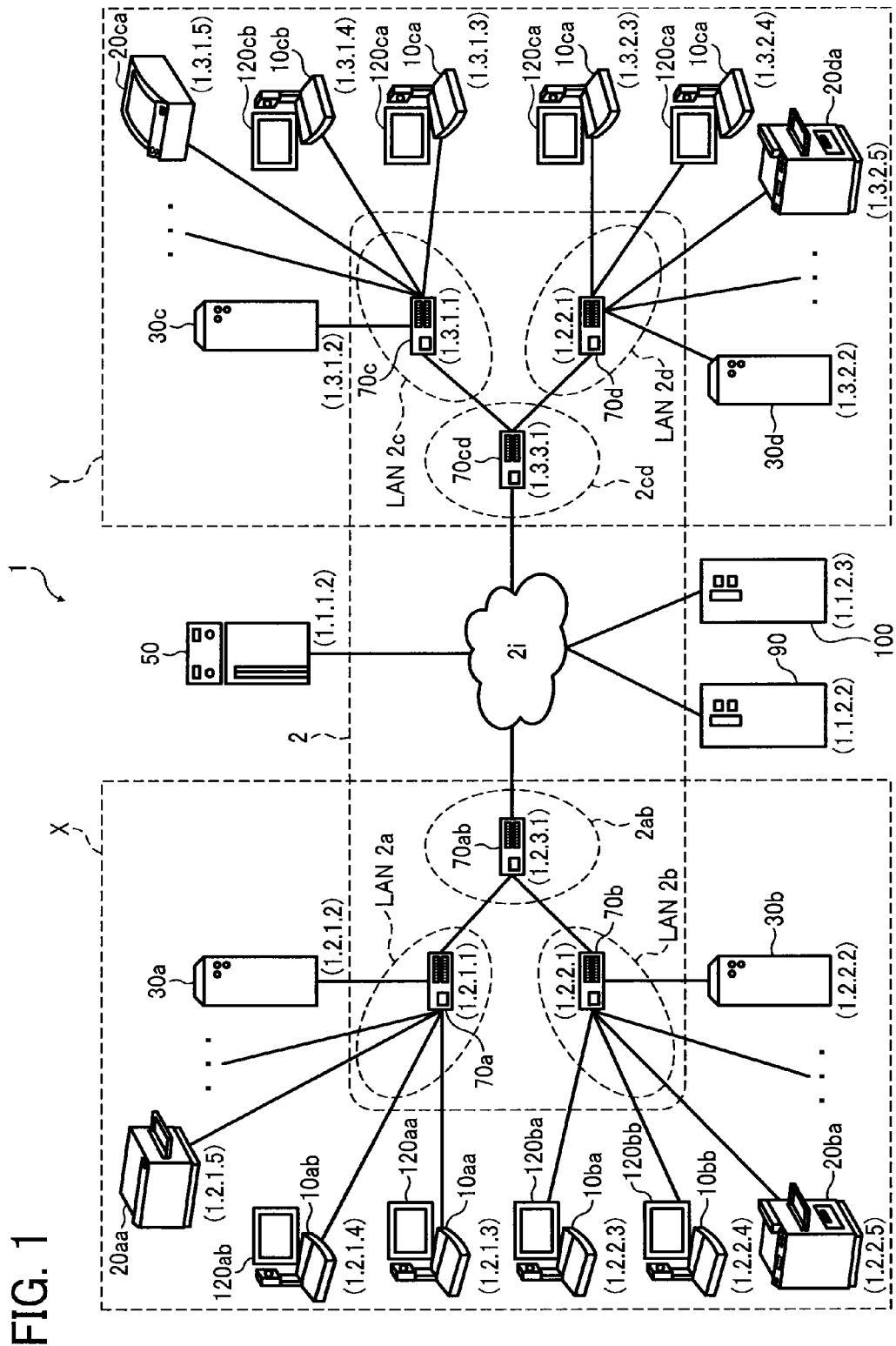
FIG. 1 is a schematic block diagram illustrating a configuration of a communication system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to FIGS. 1 to 27, an example embodiment of the present invention is described.

FIG. 1 is a schematic block diagram illustrating a communication system, according to an example embodiment of the present invention.

The communication system 1 of FIG. 1 includes a plurality of communication terminals 10aa, 10ab, 10ba, 10bb, 10ca, 10cb, 10da, and 10db, and a plurality of displays 120aa, 120ab, 120ba, 120bb, 120ca, 120cb, 120da, and 120db, a plurality of image forming apparatuses 20aa, 20ba, 20ca, and 20da, a plurality of relay devices 30a, 30b, 30c, and 30d, a communication management system 50, a program providing system 90, and a maintenance system 100.

For the descriptive purposes, in this example, any number of the plurality of terminals 10aa to 10db may be collectively or each referred to as the terminal 10. Any number of the plurality of displays 120aa to 120db may be collectively or each referred to as the display 120. Any number of the plurality of image forming apparatuses 20aa to 20da may be collectively or each referred to as the image forming apparatus 20. Any number of the plurality of relay devices 30a, 30b, 30c, and 30d may be collectively or each referred to as the relay device 30. The communication management system 50 may be referred to as the "management system" 50.

In the following, the terminal 10 that transmits data to another terminal 10 to carry out videoconference is referred to as the request terminal 10. The terminal 10 that receives data from another terminal 10 to carry out videoconference is referred to as the counterpart terminal 10. For example, the request terminal 10 includes any terminal 10 that requests another terminal 10 to start videoconference, and the counterpart terminal 10 includes any terminal 10 that is requested by the request terminal 10 to start videoconference.

The plurality of routers 70a to 70d, 70ab, and 70cd, which may be collectively or each referred to as the router 70, selects a route that is most suitable for transmitting contents data such as image data and sound data.

Still referring to FIG. 1, the terminals 10aa and 10ab, the image forming apparatus 20aa, the relay device 30a, and the router 70a are connected to a local area network (LAN) 2a. The terminals 10ba and 10bb, the image forming apparatus 20ba, the relay device 30b, and the router 70b are connected to a LAN 2b. The LAN 2a and the LAN 2b are connected to a leased line 2ab in which the router 70ab is provided. It is assumed that these devices including the terminals 10aa to 10bb are located in an area X. For example, assuming that the area is any area in Japan, the LAN 2a could be located within an office in a city such as Tokyo, and the LAN 2b could be located within an office in another city such as Osaka.

The terminals 10ca and 10cb, the image forming apparatus 20ca, the relay device 30c, and the router 70c are connected to a LAN 2c. The terminals 10da and 10db, the image forming apparatus 20da, the relay device 30d, and the router 70d are connected to a LAN 2d. The LAN 2c and the LAN 2d are connected to a leased line 2cd in which the router 70cd is provided. It is assumed that these devices including the terminals 10ca to 10db are located in an area Y apart from the area X. For example, assuming that the area is any area in the United States, the LAN 2c could be located within an office in a city such as New York, and the LAN 2d could be located within an office in another city such as Washington, D.C. The area X and the area Y are connected through the Internet 2i, via the routers 70ab and 70cd.

The management system 50, the program providing system 90, and the maintenance system 100 are connected through the Internet 2i to the terminal 10, the image forming apparatus 20, and the relay device 30. Any one of the management system 50, the program providing system 90, and the maintenance system 100 may be located at any location within or outside any one of the area X and the area Y.

In this example, the communication network 2 includes the LAN 2a, LAN 2b, leased line 2ab, Internet 2i, leased line 2cd, LAN 2c, and LAN 2d. Any one or any portion of these lines or any other lines that may be included in the communication network 2 may be implemented as wired network or wireless network such as Wireless Fidelity (WiFi) network, Bluetooth (Registered Trademark) network, TransferJet (Registered Trademark), or NFC network.

As shown in FIG. 1, the terminal 10, the image forming apparatus 20, the relay device 30, the management system 50, the router 70, the program providing system 90, and the maintenance system 100 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the IP address may be expressed in IPv6.

Further, in this example, the terminal 10 may be communicated in various ways. For example, at least two different terminals 10 that are located at different rooms in the same office, or at least two different terminals 10 that are located at different offices that are remotely located from one another, may communicate with one another. In another example, at least two different terminals 10 that are located in the same room may communicate with one another. In another example, one terminal 10 that is located indoor and another terminal 10 that is located outdoor, or at least two different terminals 10 that are both located outdoor, may communicate with one another. When the terminal 10 is located outdoor, the terminal 10 communicates with the other terminal 10 through a wireless network such as a wireless network designed for a mobile phone.

Referring to FIG. 1, the terminal 10 transmits or receives contents data such as image data and/or sound data to or from a counterpart terminal 10 to establish communication with the counterpart terminal 10. The terminal 10 of FIG. 1 is, for example, a videoconference terminal that transmits or receives contents data to carryout videoconference or teleconference. In one example, the terminal 10 may transmit or receive image data in addition to sound data. Alternatively, the terminal 10 may transmit or receive only sound data.

The image forming apparatus 20 is, for example, a printer that prints data to be printed ("print data"), based on image data of graphics or text, onto a recording sheet to have a printed image. The image forming apparatus 20 may be implemented by any desired image forming apparatus capable of forming an image, such as a printer, facsimile, copier, or multifunctional peripheral (MFP).

The relay device 30 relays contents data such as image data or sound data between or among the terminals 10. For example, the relay device 30 may be implemented by a router or any device that provides the function of router, or may be implemented by a computer system such as one or more computers that provide the function of router.

The management system 50 is a computer system, which may be implemented by one or more computers, to centrally manage various information such as login information of the terminal 10 or the image forming apparatus 20, the operation state of the terminal 10 or the image forming apparatus 20 such as the communication state of the terminal 10 or the image forming apparatus 20, candidate list information, and the communication state of the relay device 30. In this example, a moving image, a still image, or both of the still image and the moving image, may be transmitted as the image data.

The program providing system 90 is a computer system, which provides various programs to be used by the terminal 10, the image forming apparatus 20, the relay device 30, the management system 50, and the maintenance system 100, respectively, via the communications network 2. More specifically, the program providing system 90 includes a hard disk device (HD) 504 (FIG. 7), which stores a terminal control program that causes the terminal 10 to perform various functions or operations. For example, the program providing system 90 sends the terminal control program to the terminal 10 through the Internet 2i to cause the terminal 10 to install the terminal control program. Further, the HD 504 of the program providing system 90 may store an image forming control program that causes the image forming apparatus 20 to perform various functions or operations. For example, the program providing system 90 sends the image forming control program to the image forming apparatus 20 through the Internet 2i to cause the image forming apparatus 20 to install the image forming control program. Further, the HD 504 of the program providing system 90 may store a relay control program that causes the relay device 30 to perform various functions or operations. For example, the program providing system 90 sends the relay control program to the relay device 30 through the Internet 2i to cause the relay device 30 to install the relay control program. Further, the HD 504 of the program providing system 90 may store a communication management program that causes the management system 50 to perform various functions or operations. For example, the program providing system 90 sends the communication management program to the management system 50 to cause the management system 50 to install the communication management program.

The maintenance system 100 is implemented as a computer system having one or more computers capable of maintaining, managing, fixing, or upgrading at least one of the terminal 10, image forming apparatus 20, relay device 30, management system 50, and program providing system 90. Assuming that the maintenance system 100 is provided within a country, and the terminal 10, image forming apparatus 20, relay device 30, management system 50, and program providing system 90 are each installed outside the country, the maintenance system 100 maintains, manages, fixes, or upgrades at least one of the terminal 10, image forming apparatus 20, relay device 30, management system 50, and program providing system 90, remotely through the communication network 2. The maintenance system 100 may manage maintenance of at least one of the terminal 10, image forming apparatus 20, relay device 30, management system 50, and program providing system 90 without using the communication network 2. For example, a machine type number, a manufacturing number, customer information, maintenance and repair information, and failure log information may be maintained at the maintenance system 100 without using the communication network 2.

Figure 2:
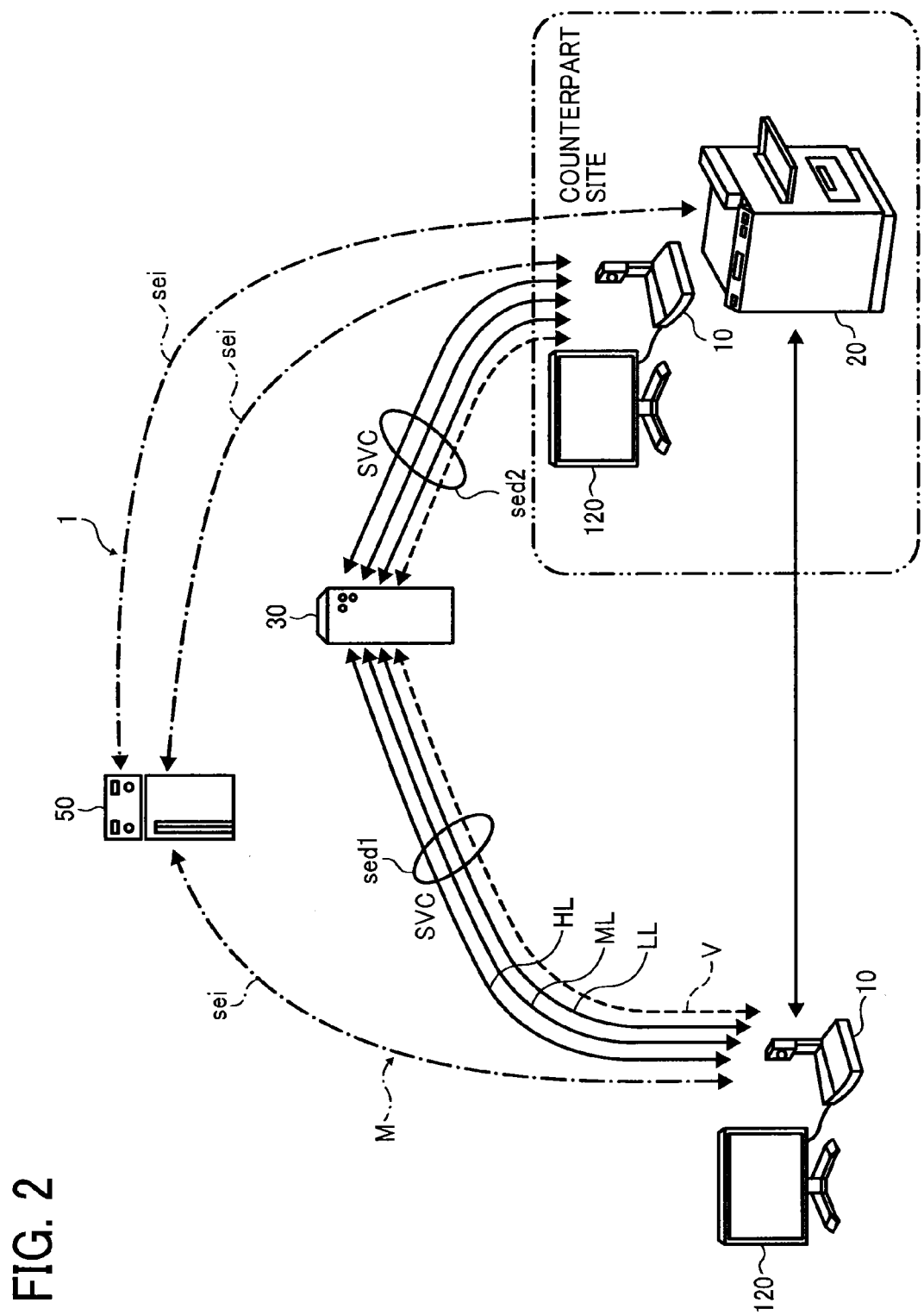
FIG. 2 is an illustration for explaining transmission or reception of data such as image data, sound data, or management data, performed by the communication system of FIG. 1.

Referring now to FIGS. 2 and 3, operation in which two communication terminals are communicated with each other is described as an example.

In the communication system 1 as illustrated in FIG. 2, the request terminal 10 that requests starting of communication, transmits or receives various data for communication with the counterpart terminal 10. The request terminal 10 may transmit image data to the image forming apparatus 20, which is located at a site where the counterpart terminal 10 is located, and instructs the image forming apparatus 20 to print an image based on the received image data. The printed image may be viewed by the user who is communicating through the counterpart terminal 10. The terminal 10 is mainly provided with the function of communicating using image data and/or sound data, and the image forming apparatus 20 is mainly provided with the function of printing, such that they differ in processing capability. However, since they both communicate with the request terminal 10, any one of the communication terminal 10 and the image forming apparatus 20 may be referred to as the counterpart terminal. As described below, the image forming apparatus 20 is managed by the management system 50, as the communication terminal capable of communicating with the communication terminal 10.

Referring to FIG. 2, the request terminal 10 and the management system 50, the counterpart terminal 10 and the management system 50, and the image forming apparatus 20 (functioning as the counterpart terminal) and the management system 50 each establish a management data communication session "sei" through which various types of management data "M" are transmitted. The management data communication session "sei" is a communication session used for the call control process.

The terminal 10 transmits or receives contents data through the relay device 30 in compliance with a predetermined communications protocol. The communications protocol used by the terminal 10 is mainly defined by a call control protocol used for connecting or disconnecting connections with the counterpart terminal, and an encoding format used for encoding the contents data to an IP packet.

Examples of the call control protocol being used by the terminal 10 include, but not limited to, (1) session initial protocol (SIP), (2) H.323, (3) the extended SIP, (4) Instant Messenger (IM) Protocol such as extensible messaging and presence protocol (XMPP), ICQ (Registered Trademark), AIM (Registered Trademark), or Skype (Registered Trademark), (5) protocol using the SIP message method, (6) Internet relay chat (IRC) protocol, and (7) extended IM based protocol such as Jingle.

Examples of the encoding format include, but not limited to, H.264/SVC (Scalable vide coding) encoding format and H.264/AVC (Advanced video coding) encoding format. More specifically, when the SVC encoding format is used, the request terminal 10 and the relay device 30 establish a first communication session "sed1" to transmit or receive four types of contents data for communication. Referring to FIG. 2, the first communication session "sed1" includes four contents data communication sessions including a session "HL" to transmit high-level resolution image data, a session "ML" to transmit medium-level resolution image data, a session "LL" to transmit low-level resolution image data, and a session "V" to transmit sound data. The counterpart terminal 10 establishes a second communication session "sed2" with the relay device 30 using the SVC encoding format, which includes four contents data communication sessions including a session "HL" to transmit high-level resolution image data, a session "ML" to transmit medium-level resolution image data, a session "LL" to transmit low-level resolution image data, and a session "V" to transmit sound data.

Figure 3A:
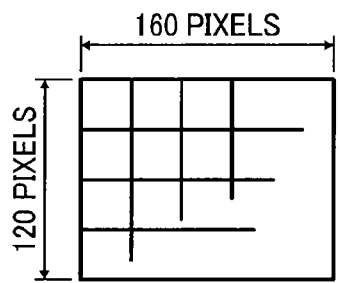
FIGS. 3A to 3C are illustrations for explaining image quality of image data transmitted or received by the communication system of FIG. 2, according to the SVC standards.
Figure 3B:
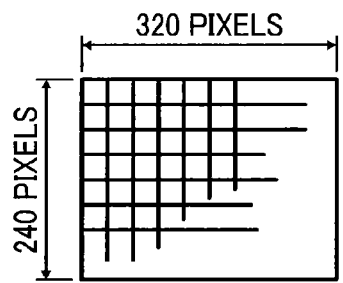
Figure 3C:
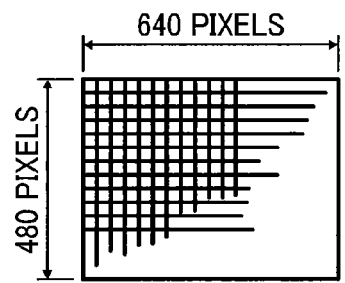

Referring now to FIGS. 3A to 3C, resolution of image data to be transmitted or received by the communication system of FIG. 2, in compliance with the SVC standards, is explained in more detail.

As illustrated in FIG. 3A, the low-level resolution image data, which functions as a base image, has 160 pixels in the horizontal direction and 120 pixels in the vertical direction. Referring to FIG. 3B, the medium-level resolution image data has 320 pixels in the horizontal direction and 240 pixels in the vertical direction. Referring to FIG. 3C, the high-level resolution image data has 640 pixels in the horizontal direction and 480 pixels in the vertical direction. In case of communicating with a narrowband signal line, low-quality image data that is generated based on the low-level resolution image data, which is the base image, is transmitted. In case of communicating with a wideband signal line, medium-quality image data that is generated based on the low-level resolution image data and the medium-level resolution image data is transmitted. In case of communicating with a broadband signal line, high-quality image data that is generated based on the low-level resolution image data, the medium-level resolution image data, and the high-level resolution image data is transmitted. Any one of the above-described types of image data may be transmitted together with sound data such as voice data.

Referring back to FIG. 2, the request terminal 10 communicates with the image forming apparatus 20, which functions as the counterpart terminal, without intervening the relay device 30 to directly transmit or receive data such as image data being captured by the terminal 10. As illustrated in FIGS. 1 and 2, the request terminal 10 may transmit image data to the image forming apparatus 20 at the counterpart site where the counterpart terminal 10 is located, through the communications network 2 such as the LAN and the Internet.

As described above, the management data communication session "sei", based on the SIP (Session Initial Protocol), is established between the management system 50 and the counterpart terminal 10 or the image forming apparatus 20. In alternative to the SIP, any desired call control method may be used.

<Hardware Structure of Communication System>

Figure 4:
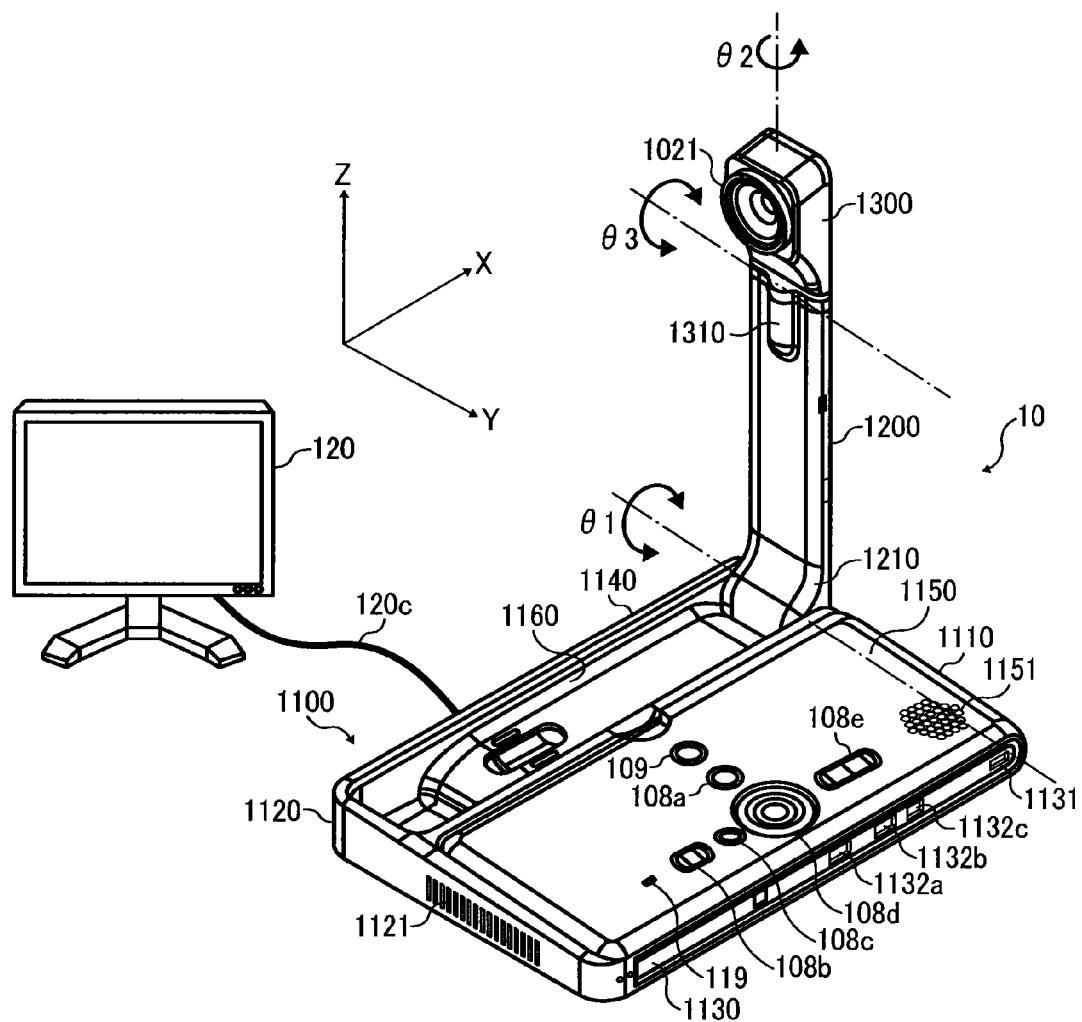
FIG. 4 is a perspective view illustrating the outer appearance of a communication terminal of the communication system of FIG. 1.

FIG. 4 is a perspective view illustrating the outer appearance of the communication terminal 10 of the communication system 1 of FIG. 1. As illustrated in FIG. 4, the terminal 10 includes a body 1100, an arm 1200, and a camera housing 1300. The body 1100 includes a front side wall 1110 having a plurality of air intake holes that are formed over the nearly entire surface of the intake surface of the front side wall 1110. The body 1100 further includes a back side wall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, a microphone 114

(FIG. 5) of the terminal 10 is able to catch sounds such as human voice or any sound including noise.

Figure 5:
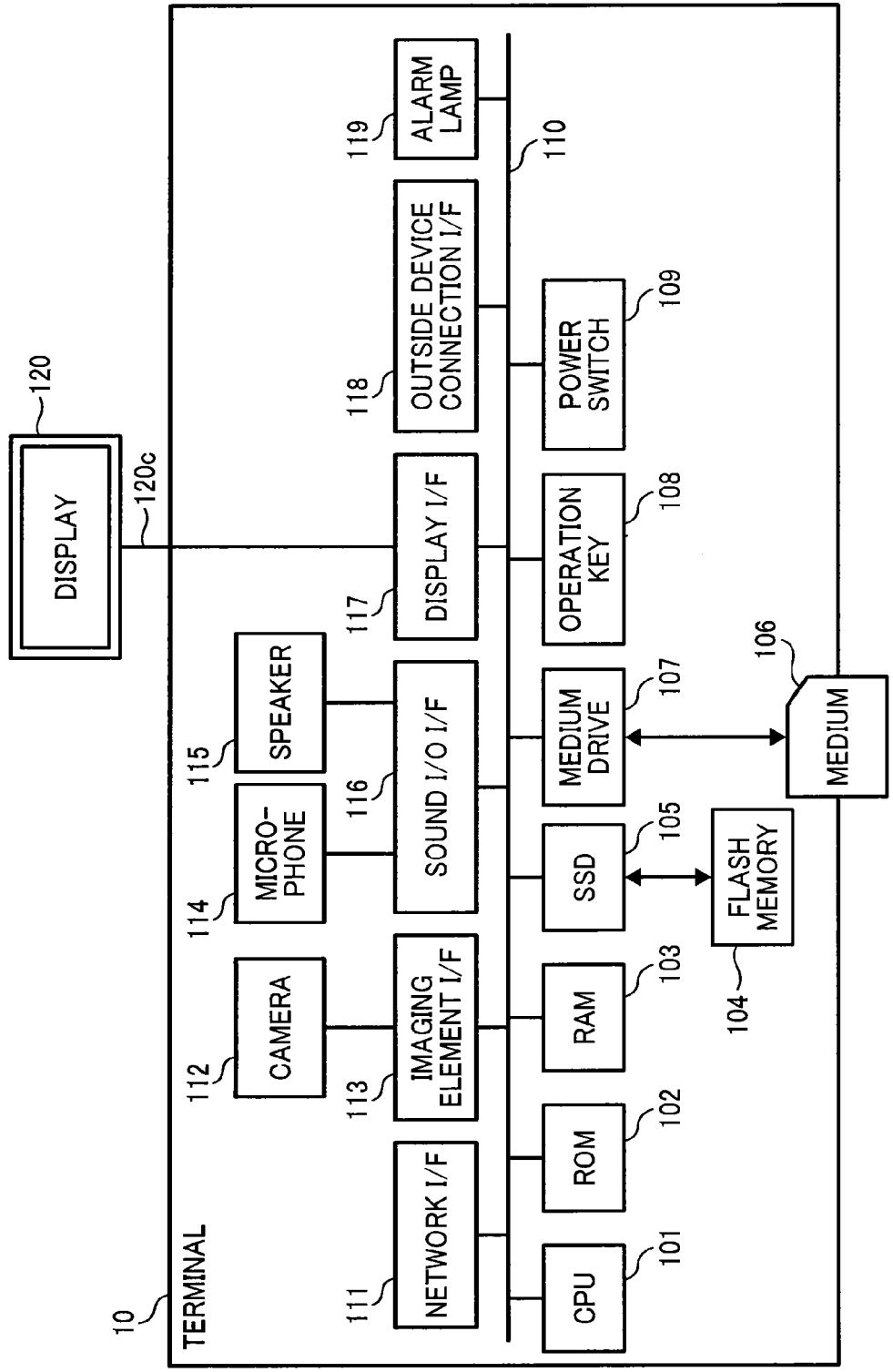
FIG. 5 is a schematic block diagram illustrating a hardware structure of the communication terminal of FIG. 1.

The body 1100 has an operation panel 1150, which is provided at a front surface toward the right side wall 1130. The operation panel 1150 includes a plurality of operation keys 108a to 108e ("the operation button 108"), a power switch 109, an alarm lamp 119, and a plurality of sound output holes 1151. Through the sound output holes 1151, a speaker 115 (FIG. 5) of the terminal 10 is able to output sounds such as sounds generated based on human voice. The body 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an outside device connection I/F 118 (FIG. 5). The body 1100 further includes a left side wall 1140, which is provided with a connection port to connect the external display 120 to the display I/F 117 through a cable 120c.

The arm 1200 is fixed to the body 1100 via a torque hinge 1210. With the torque hinge 1210, the arm 1200 can be rotated in directions of up and down with respect to the body, while making a tilt angle θ1 of up to 135 degrees. FIG. 4 illustrates the case where the tilt angle θ1 is 90 degrees.

The camera housing 1300 incorporates therein the camera 112 (FIG. 5) that takes an image of an object. The object may be a part of a user, document, or a room where the terminal 10 is located. The camera housing 1300 is provided with a torque hinge 1310. The camera housing 1300 is fixed to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 4, the pan angle θ2 and the tilt angle θ3 are each 0 degree.

The relay device 30, the management system 50, the program providing system 90, and the maintenance system 100 are each implemented by any desired number of general-purpose computers such as a personal computer or a server computer. For simplicity, explanation of the outer appearance of the computer is omitted. Further, the image forming apparatus 20 is implemented by any desired image forming apparatus, such that the outer appearance thereof is omitted.

FIG. 5 is a schematic block diagram illustrating a hardware structure of the communication terminal 10. As illustrated in FIG. 5, the terminal 10 includes a central processing unit (CPU) 101, a read only memory (ROM) 102, a random access memory (RAM) 103, a flash memory 104, a solid state drive (SSD) 105, a medium drive 107, the operation button 108, the power switch 109, a network interface (I/F) 111, the camera 112, an imaging element interface (I/F) 113, the microphone 114, the speaker 115, a sound input/output interface (I/O I/F) 116, the display interface (I/F) 117, the outside device connection interface (I/F) 118, and an alarm lamp 119, which are electrically connected through a bus 110 such as an address bus or data bus. The CPU 101 controls entire operation of the terminal 10. The ROM 102 stores therein a control program for execution by the CPU 101, such as an initial program loader (IPL). The RAM 103 functions as a work area of the CPU 101. The flash memory 104 stores therein various data such as the terminal control program, image data, or sound data such as voice data. The SSD 105 controls reading or writing of various data with respect to the flash memory 104 under control of the CPU 101. The medium drive 107 controls reading or writing of various data with respect to a removable recording medium 106 such as a flash memory. The operation key 108 allows the user to input a user instruction, for example, by allowing the user to select a communication destination such as the counterpart terminal 10. The power switch 109 allows the user to switch on or off the power of the terminal 10. The network I/F 111 allows the terminal 10 to transmit data through the communications network 2.

The camera 112 takes an image of an object to obtain image data under control of the CPU 101. The imaging element I/F 113 controls operation of the camera 112. The microphone 114 catches sounds such as voice of the user at the terminal 10. The speaker 115 outputs sounds such as sounds generated based on voice of the user at the counterpart terminal 10. The sound I/O I/F 116 controls input or output of sound signals such as voice signals with respect to the microphone 114 and the speaker 115 under control of the CPU 101. The display I/F 117 transmits image data to the display 120 under control of the CPU 101. The outside device connection I/F 118 controls connection of the terminal 10 to various types of outside device. The alarm lamp 119 generates notification when an error is detected in the terminal 10.

The display 120 may be implemented by a liquid crystal display (LCD) or an organic light emitting display, which displays various data such as an image of an object or an operation icon. As illustrated in FIGS. 4 and 5, the display 120 is connected to the display I/F 117 through the cable 120c. The cable 120c may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as an external camera, external microphone, or external speaker through a universal serial bus (USB) cable that is connected through the port 1132 of the body 1100 (FIG. 4). When the external camera is connected to the terminal 10, the CPU 101 causes the terminal 10 to capture an image using the external camera, rather than the camera 112 that is incorporated in the terminal 10. When the external microphone or the external speaker is connected to the terminal 10, the CPU 101 causes the terminal 10 to use the external microphone or the external speaker in replace of the incorporated microphone 114 or the incorporated speaker 115.

The recording medium 106, which can be freely attached to or detached from the terminal 10, includes any desired type of recording medium. In alternative to the flash memory 104, any nonvolatile memory that is readable and writable under control of the CPU 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 6:
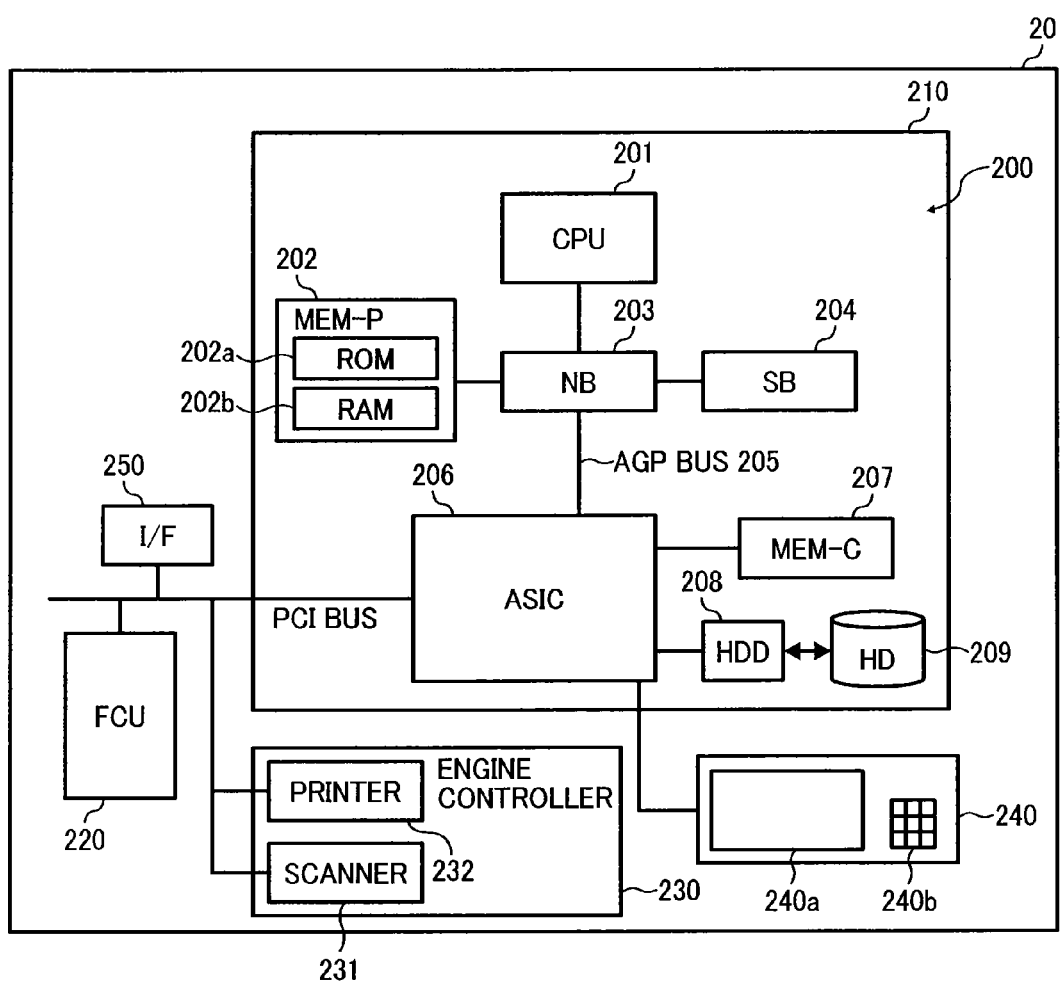
FIG. 6 is a schematic block diagram illustrating a hardware structure of an image forming apparatus of the communication system of FIG. 1.

Referring now to FIG. 6, a hardware structure of the image forming apparatus 20 is explained according to an example embodiment of the present invention. In this example, the image forming apparatus 20 is implemented by a MFP, which includes a controller 210, a fax control unit (FCU) 220, an engine controller 230, an operation panel 240, and a communication interface (I/F) 250. The engine controller 230 includes a scanner 231 and a printer 232. The scanner 231 or the printer 232 is provided with an image processor capable of performing various image processing such as error-diffusion processing or gamma conversion. The operation panel 240 includes a panel display 240a and an operation device 240b. The panel display 240a, which may be implemented by a touch panel, displays various information such as current set values or a screen for selection, and receives a user input. The operation device 240b, which may be implemented by a ten-key or a start key that receives an instruction such as an instruction for starting copy operation, receives a user instruction for setting a value regarding image forming parameters such as an image density parameter value. The controller 210 controls entire operation of the image forming apparatus 20. For example, the controller 210 controls drawing processing, communication, or various user inputs through the operation panel 240.

In response to selection of an application switch key on the operation panel 240, the image forming apparatus 20 may switch to a document-box mode to perform the document-box function, a copy mode to perform the copy function, a printer mode to perform the printer function, or a fax mode to perform the facsimile function. The document-box function allows the user to store image data in a memory of the image forming apparatus 20.

The controller 210 includes a CPU 201, a system memory (MEM-P) 202, a north bridge (NB) 203, a south bridge (SB) 204, an application specific integrated circuit (ASIC) 206, and a memory such as a local memory (MEM-C) 207, a HDD 208, and a HD 209. The NB 203 and the ASIC 206 are connected through an accelerated graphics port (AGP) bus 205.

The CPU 201 functions as a controller that controls entire operation of the image forming apparatus 20. The NB 203 is a bridge that connects the CPU 201, the MEM-P 202, SB 204, and AGP bus 205. The NB 203 includes a memory controller that controls reading or writing with respect to the MEM-P 202, a peripheral component interconnect (PCI) master, and an AGP target.

The MEM-P 202 includes a ROM 202a that stores various programs or data that cause the controller 210 to execute various functions, and a RAM 202b that functions as a memory area for deploying program or data or a drawing memory area for printing. Any program stored in the RAM 202b may be alternatively stored in any desired computer-readable recording medium in an installable or executable file format, such as CD-ROM, FD, CD-R, or DVD. For example, the control program related to image forming may be stored in the ROM 202a.

The DB 204 is a bridge that connects the NB 203, PCI device, and peripheral device. The ASIC 206 is an integrated circuit specially designed for image processing, which includes hardware for image processing. The ASIC 206 functions as a bridge that connects the AGP bus 205, PCI bus, HD 208, and MEM-C 207. The ASIC 206 includes a PCI target, AGP master, an arbiter (ARB) that is a core of the ASIC 206, a memory controller that controls the MEM-C 207, a plurality of direct memory access controllers (DMACs) that rotates image data using hardware logic, and a PCI unit that transfers data between the scanner 231 and the printer 232 via the PCI bus. The ASIC 206 is connected to the FCU 220 via the PCI bus. In addition to the FCU 220, the ASIC 206 may be connected to the USB (universal serial bus) interface or the IEEE1394 (Institute of Electrical and Electronics Engineers 1394) interface.

The MEM-C 207 is a local memory that functions as a copy image buffer or a coding buffer. The HD 209 stores image data, font data for printing, and form data. Under control of the CPU 201, the HD 209 controls reading or writing of data with respect to the HD 209. The AGP bus 205 is a bus interface designed for a graphics accelerator card, which speeds up graphics processing. With direct high throughput access to the MEM-P 202, processing speeds of the graphics accelerator card increase.

Figure 7:
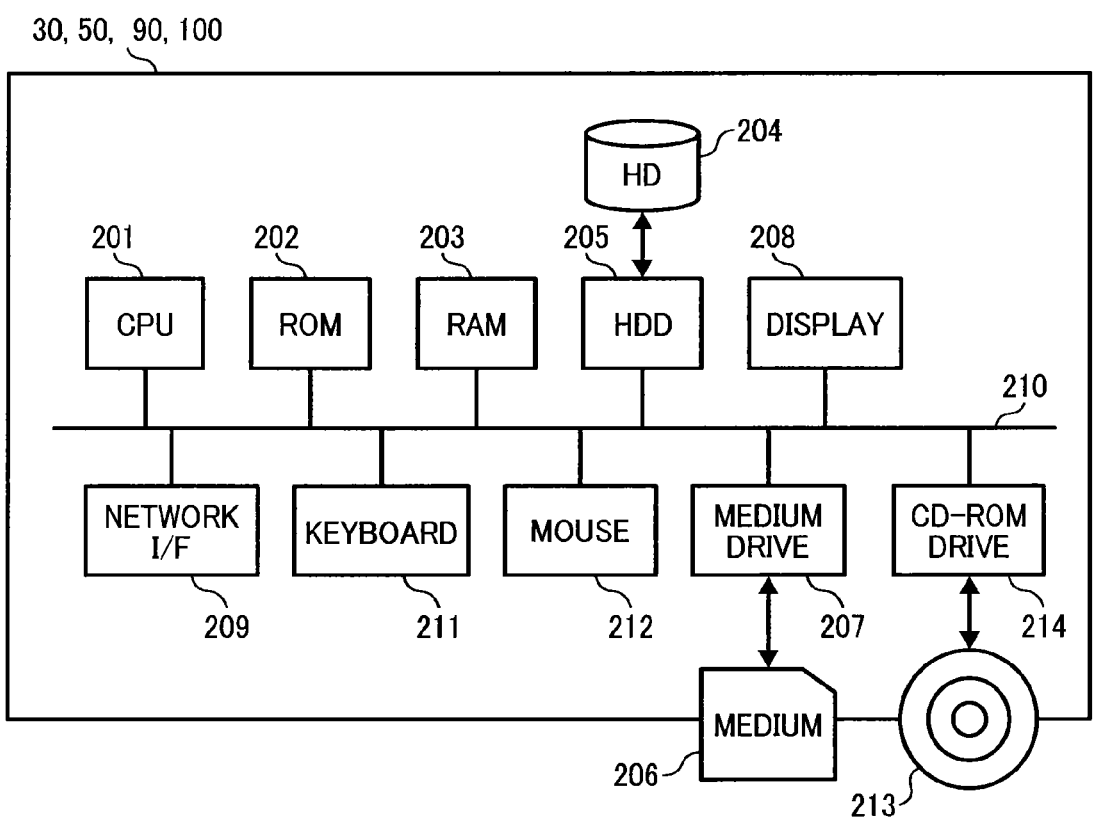
FIG. 7 is a schematic block diagram illustrating a hardware structure of any one of the communication management system, relay device, program providing system, and maintenance system of the communication system of FIG. 1.

FIG. 7 illustrates a hardware structure of the management system 50 of FIG. 1. The management system 50 includes a CPU 501, a ROM 502, a RAM 503, the HD 504, a hard disk drive (HDD) 505, a medium drive 507, a display 508, a network interface (I/F) 509, a keyboard 511, a mouse 512, and a CD-ROM drive 514, which are electrically connected through a bus 510 such as an address bus or a data bus.

The CPU 501 controls entire operation of the management system 50. The ROM 502 stores a control program for execution by the CPU 501, such as an IPL. The RAM 503 functions as a work area of the CPU 501. The HD 504 stores therein various data such as the communication management program. The HDD 505 controls reading or writing of various data with respect to the HD 504 under control of the CPU 501. The medium drive 507 controls reading or writing of various data with respect to a removable recording medium 506 such as a flash memory. The display 508 displays various data such as a cursor, menu, window, character, or image. The network I/F 509 allows the management system 50 to transmit data through the communications network 2. The keyboard 511 includes a plurality of keys, each of which is used for inputting a user instruction through a character, a numeral, or a symbol. The mouse 512 allows the user to input a user instruction including, for example, selection or execution of a specific instruction, selection of an area to be processed, and instruction of cursor movement. The CD-ROM drive 514 controls reading or writing of various data with respect to a CD-ROM 513. In alternative to the CD-ROM 513, any removable recording medium may be used.

The communication management program may be written onto a recording medium that is readable by a general-purpose computer such as the recording medium 506 or the CD-ROM 513 in any format that is installable or executable by a general-purpose computer. Once the communication management program is written onto the recording medium, the recording medium may be distributed. Further, the communication management program may be stored in any desired memory other than the HD 504, such as the ROM 502.

The relay device 30 is substantially similar in hardware structure to the management system 50 of FIG. 7, except for replacement of the management program with a relay device control program that is used for controlling the relay device 30. The relay device control program may be written onto a recording medium that is readable by a general-purpose computer such as the recording medium 506 or the CD-ROM 513 in any format that is installable or executable by the general-purpose computer. Once the relay device control program is written onto the recording medium, the recording medium may be distributed. Further, the relay device control program may be stored in any desired memory other than the HD 504, such as the ROM 502.

The program providing system 90 is substantially similar in hardware structure to the management system 50 of FIG. 7, except for replacement of the management program with a program providing program that is used for controlling the program providing system 90. The program providing program may be written onto a recording medium that is readable by a general-purpose computer such as the recording medium 506 or the CD-ROM 513 in any format that is installable or executable by the general-purpose computer. Once the program providing program is written onto the recording medium, the recording medium may be distributed. Further, the program providing program may be stored in any desired memory other than the HD 504, such as the ROM 502.

The maintenance system 100 is substantially similar in hardware structure to the management system 50 of FIG. 7, except for replacement of the management program with a maintenance program that is used for controlling the maintenance system 100. The maintenance program may be written onto a recording medium that is readable by a general-purpose computer such as the recording medium 506 or the CD-ROM 513 in any format that is installable or executable by the general-purpose computer. Once the maintenance program is written onto the recording medium, the recording medium may be distributed. Further, the maintenance program may be stored in any desired memory other than the HD 504, such as the ROM 502.

Other examples of removable recording medium, which may be used in replace of the CD-ROM 513, include, but not limited to, compact disc recordable (CD-R), digital versatile disk (DVD), and blue ray disc.

<Functional Structure of Communication System>

Figure 8:
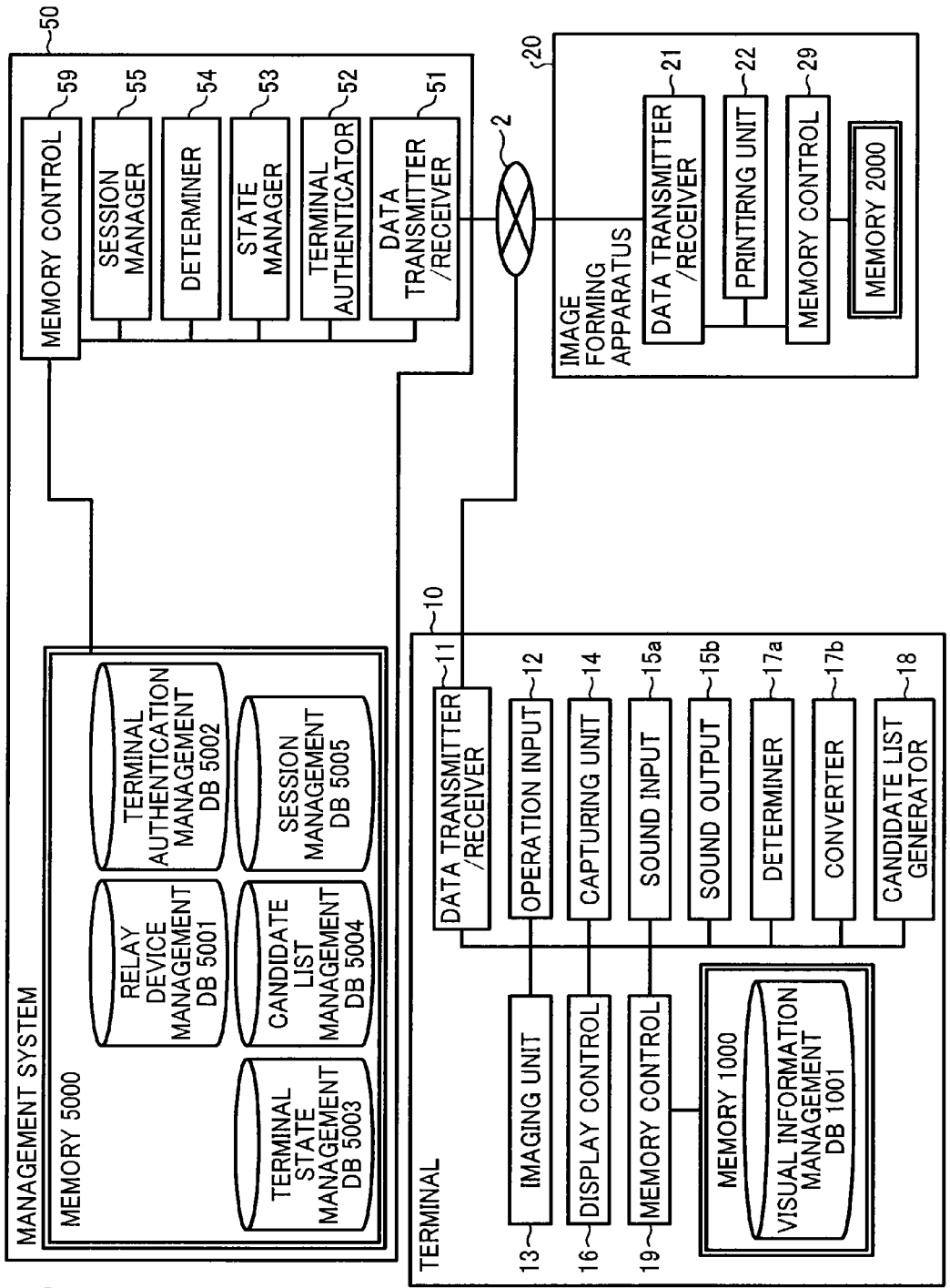
FIG. 8 is a schematic block diagram illustrating a functional structure of the communication terminal, image forming apparatus, and communication management system of the communication system of FIG. 1.

Next, a functional structure of the communication system of FIG. 1 is explained according to an example embodiment of the present invention. FIG. 8 is a schematic block diagram illustrating the functional structure of the communication system 1. As illustrated in FIG. 8, the terminal 10, the image forming apparatus 20, and the management system 50 exchange data with one another through the communications network 2. In FIG. 8, the relay device 30, the program providing system 90 and the maintenance system 100 of FIG. 1 are omitted.

<Functional Structure of Terminal>

The terminal 10 includes a data transmitter/receiver 11, an operation input 12, an imaging unit 13, a capturing unit 14, a sound input 15*a*, a sound output 15*b*, a display control 16, a determiner 17*a*, a converter 17*b*, a candidate list generator 18, and a memory control 19. These units shown in FIG. 8 correspond to a plurality of functions or functional modules, which are executed according to an instruction of the CPU 101 (FIG. 5) that is generated according to the terminal control program being loaded from the flash memory 104 onto the RAM 103.

The terminal 10 further includes a memory 1000 that may be implemented by the RAM 103 and/or the flash memory 104 of FIG. 5. The memory 1000 includes a visual information management database (DB) 1001, which is implemented by a visual information management table.

(Visual Information Management Table)

FIG. 9 illustrates an example data structure of the visual information management table. The visual information management table of FIG. 9 stores terminal type information indicating a type of the counterpart terminal, operation state information indicating an operation state of the counterpart terminal, and visual information to be displayed on the display 120 in the form of candidate list. In this example, the visual information is expressed as an icon representing a specific operation state of the terminal as illustrated in FIG. 9. The terminal 10 may obtain visual information to be stored in the visual information management table of FIG. 9 from the management system 50, for example, as a response in response to the login request information transmitted from the terminal 10 (S22 of FIG. 15) or the candidate list request information transmitted from the terminal 10 (S41 of FIG. 16). Alternatively, the visual information may be previously stored in the memory 1000, before the terminal 10 is shipped to the user's site.

In this example, the visual information for the communication terminal 10 mainly has four types of visual information including visual information indicating that the operation state of the counterpart terminal is online and available for communication ("online, communication OK"), visual information indicating that the operation state of the counterpart terminal is online and communicating ("online, communicating"), visual information indicating that the operation state of the counterpart terminal is online but interrupted ("online, interrupted"), and visual information indicating that the operation state of the counterpart terminal is offline ("offline"). The visual information for the image forming apparatus 20 mainly has two types of visual information including visual information indicating that the operation state of the image forming apparatus is online ("online"), and visual information indicating that the operation state of the image forming apparatus is offline ("offline").

Alternatively, the visual information for the terminal 10 may include only two types of visual information, "online" and "offline". Alternatively, the visual information for the image forming apparatus 20 may include four types of visual information, "online, communication OK", "online, communicating (printing)", "online, interrupted", and "offline". For example, the image forming apparatus 20 is determined to be in the "online, communicating", when the image forming apparatus 20 communicates with the terminal 10 to perform printing. Alternatively, the image forming apparatus 20 is determined to be in the "online, communicating", when the image forming apparatus 20 is performing a print job. For example, the image forming apparatus 20 is determined to be in the "online, interrupted" state, when a paper jam occurs, or toner or ink is empty. Alternatively, the number of types of visual information may be three, or equal to or more than five.

Referring now to FIGS. 5 and 8, a functional structure of the terminal 10 is explained according to an example embodiment of the present invention. More specifically, in this example, the operations or functions that are performed by the terminal 10, which include the operations or functions performed by the units shown in FIG. 8, are performed in cooperation with one or more hardware devices of the terminal 10 that are shown in FIG. 5.

The data transmitter/receiver 11, which may be implemented by the network I/F 111 (FIG. 5) under control of the CPU 101, transmits or receives various data or information to or from another terminal, device, or system, through the communications network 2. In this example, the data transmitter/receiver 11 starts receiving the operation state information that indicates the operation state of each candidate counterpart terminal 10 from the management system 50, before starting communication with any counterpart terminal 10. For the descriptive purposes, in the following examples, it is assumed that the operation state information indicates whether the candidate terminal 10 is online or offline, and if online, whether the candidate terminal 10 is available for communication, for example, as described above referring to FIG. 9.

When the power of the terminal 10 is turned on, the data transmitter/receiver 11 automatically sends login request information that requests the login process, and a current IP address of the terminal 10, to the management system 50 through the communications network 2. When the power of the terminal 10 is turned off according to a user instruction received from the user through the power switch 109, the data transmitter/receiver 11 sends current operation state information of the terminal 10 to the management system 50, which indicates that the power of the terminal 10 is turned off. After the operation state information is sent, the operation input 12 turns off the power of the terminal 10. As the operation state information of the terminal 10 is sent every time the power is turned off, the management system 50 is able to know that the terminal 10 is offline in realtime. In alternative to sending login request information in response to turning on the power, the data transmitter/receiver 11 may send the login request information in response to a user instruction for logging in.

The operation input 12 receives a user instruction input by the user through the operation key 108 or the power switch 109 (FIG. 4), under control of the instructions received from the CPU 101 (FIG. 5). For example, when the user selects "ON" using the power switch 109, the operation input 12 receives a user instruction for turning the power on, and causes the terminal 10 to turn on the power.

The operations or functions of the imaging unit 13 of the terminal 10 are performed by the camera 112 and the imaging element I/F 113 according to an instruction received from the CPU 101 (FIG. 5). The imaging unit 13 takes an image of an object to output image data of the object.

Figure 19:
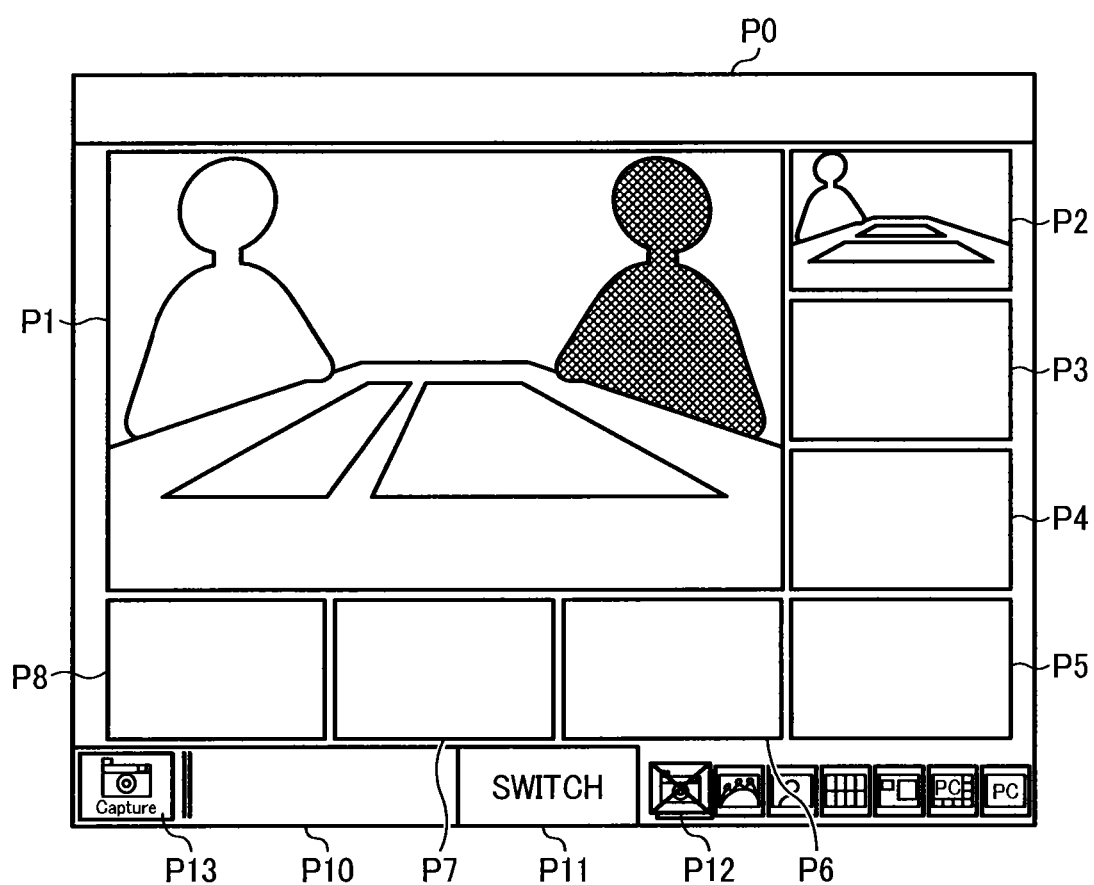
FIG. 19 is an illustration of an example communication screen, displayed at the communication terminal of FIG. 8.

The capturing unit 14, which may be implemented by the instructions from the CPU 101 (FIG. 5), detects selection of the "capture" key of FIG. 19 by the user. In response to the user selection of the "capture" key, the capturing unit 14 captures an image of the object being captured by the imaging element 13, or an image being displayed on the display 120.

The operations or functions of the sound input 15*a* of the terminal 10 are performed by the sound I/O I/F 116 according to an instruction received from the CPU 101, in cooperation with the microphone 114. After the microphone 114 converts sounds of the user at the terminal 10 to a sound signal, the sound input 15*a* inputs the sound signal in the form of sound data for further processing. The operations or functions of the sound output 15*b* of the terminal 10 are performed by the sound I/O I/F 116 according to an instruction received from the CPU 101, in cooperation with the speaker 115. The sound output 15*b* outputs a sound signal of sound data that is received from the counterpart terminal 10 through the speaker 115.

The operations or functions of the display control 16 of the terminal 10 of FIG. 8 are performed by the display I/F 117 according to an instruction received from the CPU 101 (FIG. 5). The display control 16 controls transmit of image data, which is generated based on image data of different resolutions, to the display 120. The display control 16 further causes the display 120 that is provided for the request terminal 10 to display a candidate list before the request terminal 10 starts videoconference with a desired counterpart terminal 10.

Figure 17:
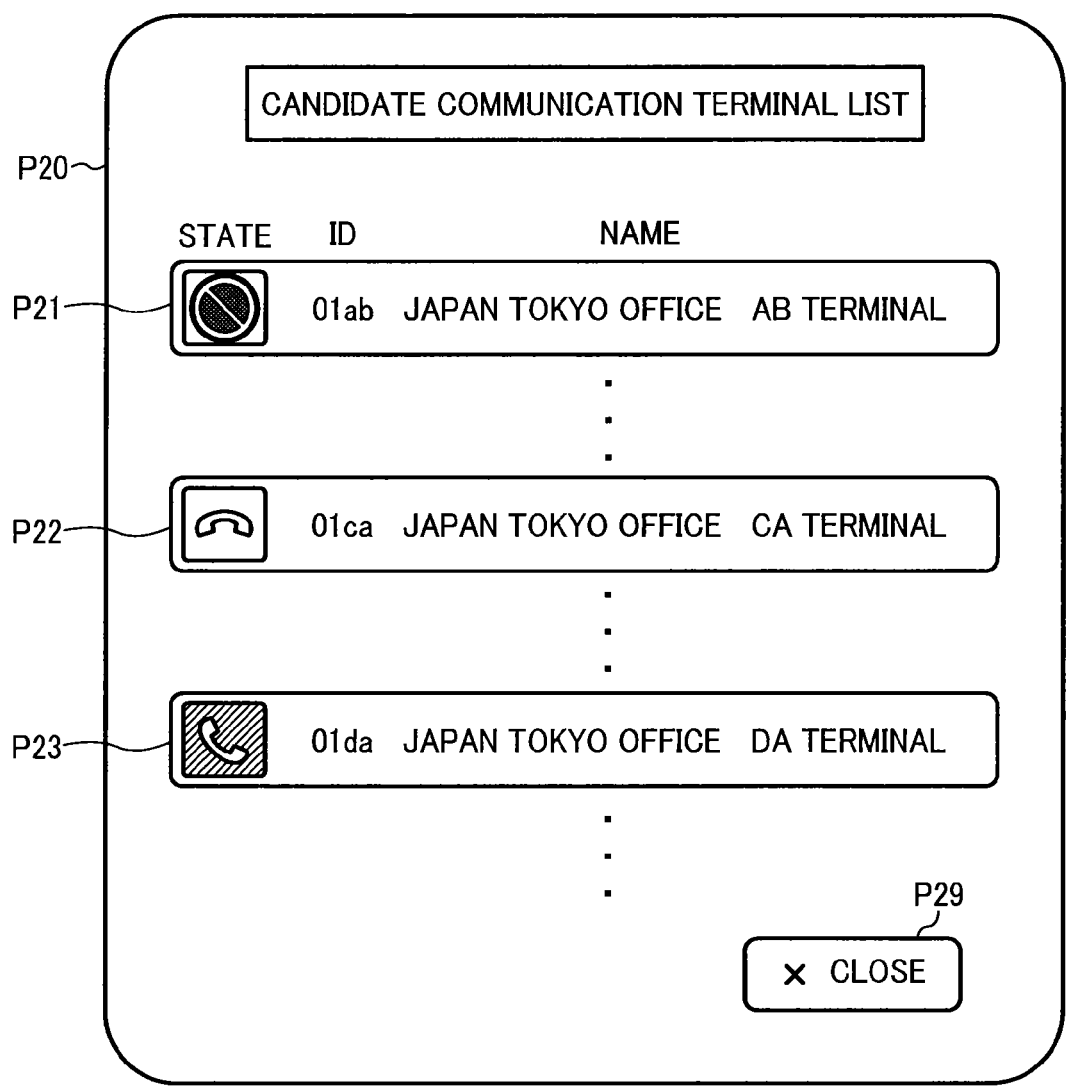
FIG. 17 is an illustration of an example candidate list screen, displayed at the communication terminal of FIG. 8 before starting communication, according to an example embodiment of the present invention.
Figure 23:
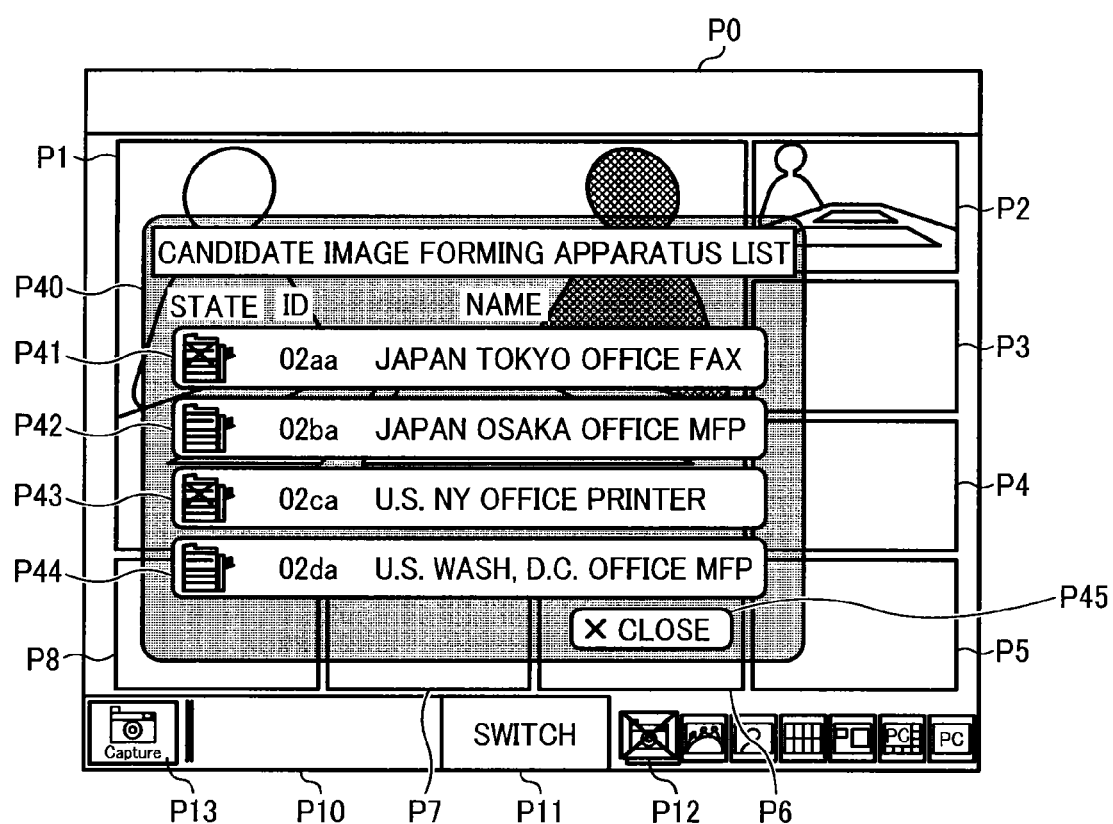
FIG. 23 is an illustration of an example candidate list screen, displayed at the communication terminal of FIG. 8 while communicating with the counterpart communication terminal.

In one example, the data transmitter/receiver 11 receives the operation state information regarding the operation state of the candidate terminal 10 from the management system 50. The display control 16 searches the visual information management table (FIG. 9) using the received operation state information as a search key to extract visual information that corresponds to the operation state specified by the operation state information, and causes the display 120 to display an image, such as an icon, based on the extracted visual information as a candidate list as illustrated in FIG. 17. In another example, the display control 16 searches the visual information management table (FIG. 9) using the operation state information of the candidate image forming apparatus 20 as a search key to extract visual information that corresponds to the operation state specified by the operation state information, and causes the display 120 to display an image, such as an icon, based on the extracted visual information as illustrated in FIG. 23.

The determiner 17*a*, which may be implemented by the instructions received from the CPU 101 (FIG. 5), determines whether the occurrence of an error is predicted based on response information, which is received from the management system 50. For example, the response information includes capability information indicating a data format of image data printable by the image forming apparatus 20. The determiner 17*a* compares a data format between the image data captured by the capturing unit 14 and the image data that is printable by the image forming apparatus 20, and determines whether to convert a data format of the image data to be transmitted to the image forming apparatus 20 for printing.

The converter 17*b*, which may be implemented by the instruction received from the CPU 101 (FIG. 5), converts the image data captured by the capturing unit 14 according to the capability information. The capability information indicating the processing capability of the image forming apparatus 20 may be received at the data transmitter/receiver 11, from the management system 50 as the response information. For example, the capability information indicates a number of bits of image data that can be processed by the image forming apparatus 20. In such case, the converter 17*b* converts the captured image data to image data having a number of bits that can be processed by the image forming apparatus 20. More specifically, the converter 17*b* converts the captured image data, which is 24-bit color image data, to 8-bit grayscale image data. In another example, the capability information indicates an encoding format that can be processed by the image forming apparatus 20. In such case, the converter 17*b* converts the captured image data captured by the capturing unit 14, to image data having an encoding format that can be processed by the image forming apparatus 20. More specifically, the converter 17*b* converts the captured image data to have an encoding format, in compliance with TIFF, PostScript, PDF, or JPEG, such that the image data is transmitted to the image forming apparatus 20 in a format printable by the image forming apparatus 20.

The candidate list generator 18, which may be implemented by the instructions received from the CPU 101 (FIG. 5), generates or updates a candidate list screen P20 of FIG. 17, based on the candidate list information and the terminal state information of the candidate terminal 10 that are respectively received from the management system 50. The candidate list screen P20 displays an image that visually reflects the operation state information of the candidate terminal, such as in the form of icon. In another example, the candidate list generator 18 generates or updates a candidate list screen P40 of FIG. 23, based on the candidate list information and the operation state information of the candidate image forming apparatus 20 that are respectively received from the management system 50. The candidate list screen P40 displays an image that visually reflects the operation state information of the image forming apparatus 20 that is the candidate terminal, such as in the form of icon.

The memory control 19 is implemented by the SSD 105 of FIG. 5 according to the instruction received from the CPU 101, or the instruction received from the CPU 101. The memory control 19 stores various data in the memory 1000, or reads out various data from the memory 1000. The memory 1000 stores therein various data such as terminal identification (ID) information for identifying the terminal 10, and a password for authenticating a user at the terminal 10. For example, the memory 1000 searches through the visual information management table (FIG. 9) using the terminal state information received at the data transmitter/receiver 11 from the management system 50 as a search key, to obtain the visual information of the counterpart terminal 10.

The memory 1000 further stores therein image data and/or sound data that is received as the terminal 10 communicates with a counterpart terminal 10 such that the image data and/or sound data are overwritten. Before the image data is overwritten, an image generated based on the image data is displayed onto the display 120. Before the sound data is output, sounds generated based on the sound data is output through the speaker 115.

In this example, any one of the terminal ID of the terminal 10 and the relay device ID of the relay device 30 includes any type of identification information that can be expressed by any language, character, symbol, mark, or any combination of language, character, symbol, and mark.

<Functional Structure of Image Forming Apparatus>

Referring to FIG. 8, the image forming apparatus 20 includes a data transmitter/receiver 21, a printing unit 22, and a memory control 29. These units shown in FIG. 8 correspond to a plurality of functions or functional modules, which are executed according to an instruction of the CPU 201 (FIG. 6) that is generated according to the image forming control program being loaded from the ROM 202a onto the RAM 202b.

The image forming apparatus 20 further includes a memory 2000 that may be implemented by the RAM 202b and/or the HD 209 of FIG. 6. The memory 2000 stores image data received from the terminal 10.

The data transmitter/receiver 21, which may be implemented by the network I/F 250 (FIG. 6) under control of the CPU 201, transmits or receives various data or information to or from another terminal, device, or system, through the communications network 2.

The printing unit 22, which may be implemented by the printer 232 of FIG. 6 according to the instructions received from the CPU 201, forms an image based on the image data stored in the memory 2000, on a recording sheet.

The memory control 29, which may be implemented by the instructions received from the CPU 201 (FIG. 6) and/or the HDD 208, stores various data in the memory 2000, or reads various data from the memory 2000.

<Functional Structure of Management System>

The management system 50 includes a data transmitter/receiver 51, a terminal authenticator 52, a state manager 53, a determiner 54, a session manager 55, and a memory control 59. These units shown in FIG. 8 correspond to a plurality of functions or functional modules, which are executed according to an instruction of the CPU 501 (FIG. 7) that is generated according to the communication management program being loaded from the HD 504 onto the RAM 503. The management system 50 further includes a memory 5000, which may be implemented by the HD 504 (FIG. 7). The memory 500 stores various databases, such as databases 5001, 5002, 5003, 5004, and 5005.

(Relay Device Management Table)

The memory 5000 includes a relay device management database (DB) 5001, which stores therein a relay device management table of FIG. 10. The relay device management table of FIG. 10 stores, for each relay device ID of the relay device 30, the operation state of the relay device 30, the received date and time at which the management system 50 receives the operation state information indicating the operation state of the relay device 30 from the relay device 30, the IP address of the relay device 30, and the maximum data transmission speed of the relay device 30 in Mbps. For example, for the relay device 30a having the relay terminal ID "111a", the relay device management table of FIG. 10 indicates that the operation state is "online", the received date and time at which the management system 50 receives the operation state information is "13:42 PM of 2/10/2013", the IP address of the relay device 30a is "1.2.1.2", and the maximum data transmission speed of the relay terminal 30a is 100 Mbps.

(Terminal Authentication Management Table)

The memory 5000 further includes a terminal authentication management database (DB) 5002, which stores a terminal authentication management table of FIG. 11. The terminal authentication management table of FIG. 11 stores a plurality of terminal IDs respectively assigned to the terminals 10 that are managed by the management system 50, in association with a plurality of passwords that are previously determined for the respective terminals 10. For example, referring to the terminal authentication management table of FIG. 11, the terminal 10aa having the terminal ID "01aa" is assigned with the password "aaaa".

(Terminal State Management Table)

The memory 5000 further includes a terminal state management database (DB) 5003, which stores a terminal state management table of FIG. 12. The terminal state management table of FIG. 12 stores, for each one of the terminal IDs assigned to the terminals 10 and the image forming apparatuses 20, the terminal type, the terminal name, the operation state, the received date and time at which the management system 50 receives the login request information from the terminal or the image forming apparatus, and the IP address of the terminal or the image forming apparatus. For example, for the terminal 10aa having the terminal ID "01aa", the terminal state management table of FIG. 12 indicates that the terminal type is "communication terminal", the terminal name is "Japan Tokyo Office AA terminal", the operation state is online ("ONLINE") and is available for communication ("COMMUNICATION OK"), the received date and time is "13:40 PM, 2/10/2013", and the IP address of the terminal 10aa is "1.2.1.3". The terminal ID, the terminal type, and the terminal name are stored in the terminal state management table of FIG. 12, when the terminal 10 or the image forming apparatus 20 is registered to the communication system 1 to be managed by the management system 50.

(Candidate List Management Table)

The memory 5000 further includes a candidate list management database (DB) 5004, which stores a candidate list management table of FIG. 13. The candidate list management table of FIG. 13 stores, for each one of a plurality of request terminals 10 capable of requesting for communication, the terminal ID of the request terminal, and one or more terminal IDs that are respectively assigned to candidate terminals 10 that are previously registered for the request terminal. In this example, the candidate terminal mainly includes the candidate communication terminal 10 and the candidate image forming apparatus 20. For example, the candidate list management table of FIG. 13 indicates that the request terminal 10aa having the terminal ID "01aa" is most likely to communicate with the terminal 10ab having the terminal ID "01ab", the terminal 10ba having the terminal ID "01ba", the terminal 10bb having the terminal ID "01bb", and the terminal 10ca having the terminal ID "01ca", etc. Further, in this example, the terminal ID "02da" of the image forming apparatus 20da is associated with the request terminal 10aa. The management system 50 manages the candidate list management table of FIG. 13, for example, according to a user instruction received from any one of the terminals 10. For example, in response to a user instruction received from the terminal 10aa, the management system 50 may add or delete the contents of the candidate list management table of FIG. 13.

(Session Management Table)

The memory 5000 further includes a session management database (DB) 5005, which stores a session management table of FIG. 14. The session management table of FIG. 14 stores information regarding each of the sessions that are carried out by at least two terminals 10 of the communication system 1. The information stored in the session management table of FIG. 14 may be used to select the relay device 30 that is most suitable for communication between at least two terminals 10. More specifically, for each session, the session management table of FIG. 14 stores a relay device ID of the relay device 30 to be used for transmitting or receiving contents data such as image data and sound data, a terminal ID of the request terminal 10, a terminal ID of the counterpart terminal 10, a delay time ms indicating a time period required for receiving contents data at the counterpart terminal 10, and the date and time information indicating the time at which the management system 50 receives delay information from the counterpart terminal 10.

For example, referring to the session management table of FIG. 14, the relay device 30a having the relay device ID "111a" is selected to relay image data and sound data between the request terminal 10aa having the terminal ID "01aa" and the counterpart terminal 10da having the terminal ID "01da". Further, the management system 50 receives the delay information from the counterpart terminal 10da at 13:50 PM, 2/10/2013. Based on the delay information, the delay time ms of 200 milliseconds (ms) is obtained. In case of having videoconference between only two terminals 10, the time at which the delay time is received may be determined based on the time when the management system 50 receives the delay information transmitted from the request terminal 10 rather than based on the time when the management system 50 receives the delay information transmitted from the counterpart terminal 10. In case of having videoconference with more than two terminals 10, the delay information transmitted from the counterpart terminal 10 that receives the image data and sound data is used to manage the date and time at which the delay information is received.

(Functional Structure of Management System)

Referring back to FIG. 8, a functional structure of the management system 50 is explained. The data transmitter/receiver 51, which may be implemented by the network I/F 509 (FIG. 7) according to an instruction received from the CPU 501, transmits or receives various data or information to or from another terminal, device, or system through the communications network 2.

Under control of the CPU 501 (FIG. 7), the terminal authenticator 52 obtains a terminal ID and a password from the login request information that is received from the data transmitter/receiver 51. Using the terminal ID and the password as a search key, the terminal authenticator 52 searches the terminal authentication management DB 5002 (FIG. 11) to determine whether the obtained set of terminal ID and password is registered. Based on the search result, the terminal authenticator 52 determines whether the user at the terminal 10 or the terminal 10 is allowed for access.

The state manager 53, which operates according to an instruction received from the CPU 501 (FIG. 7), manages the operation state of the request terminal 10 that sends the login request information using the terminal state management DB 5003 (FIG. 12). More specifically, the state manager 53 stores the terminal ID of the request terminal 10, the operation state of the request terminal 10, the date and time at which the management system 50 receives the login request information from the request terminal 10, and the IP address of the request terminal 10. When the power switch 109 is changed from the "ON" state to the "OFF" state by the user, the state manager 53 receives the operation state information indicating that the power is turned off from the terminal 10, and changes the operation state of the terminal 10 from the "online" state to the "offline" state in the terminal state management table of FIG. 12. In a substantially similar manner, when the user instruction for turning the power off is received at the image forming apparatus 20, the state manager 53 receives the operation state information indicating that the power is turned off from the image forming apparatus 20, and changes the operation state of the image forming apparatus 20 from the "online" state to the "offline" state in the terminal state management table of FIG. 12.

The determiner 54, which operates according to an instruction received from the CPU 501 (FIG. 7), determines whether to transmit operation state information to a specific terminal 10, based on the operation state of the specific terminal 10. When it is determined that the operation state of the specific terminal 10 is online, the determiner 55 determines to send the operation state information to the specific terminal 10. When it is determined that the operation state of the specific terminal 10 is not online, the determiner 55 determines not to send the operation state information to the specific terminal 10.

The session manager 55, which operates according to an instruction received from the CPU 501 (FIG. 7), stores the relay device ID of the relay device 30 for relaying contents data, the terminal ID of the request terminal 10, the terminal ID of the counterpart terminal 10, the delay time "ms" indicating delay in time at which the image data is received at the counterpart terminal 10, and the received date and time at which the delay time information transmitted from the counterpart terminal is received at the management system 50, in a corresponding manner, in the session management DB 5005 (FIG. 14) of the memory 5000. The session manager 55 further generates a session ID for identifying a session to be used for establishing the communication session, such as the contents data communication session.

The memory control 59, which operates according to an instruction received from the CPU 501 (FIG. 7) in cooperation with the HDD 505 (FIG. 7), stores various data in the memory 5000 or read out various data from the memory 5000.

<Operations of Communication System>

Referring now to FIGS. 4, 8, and 15 to 27, operation of sending image data to the image forming apparatus 20 for printing, performed by the communication system 1, is explained according to an example embodiment of the present invention. In the following examples, it is assumed that the request terminal 10aa captures a still image and transmits the captured image to the image forming apparatus 20 for printing, which is provided at a site where the counterpart communication terminal 10 that communicates with the request terminal 10aa is provided.

Figure 15:
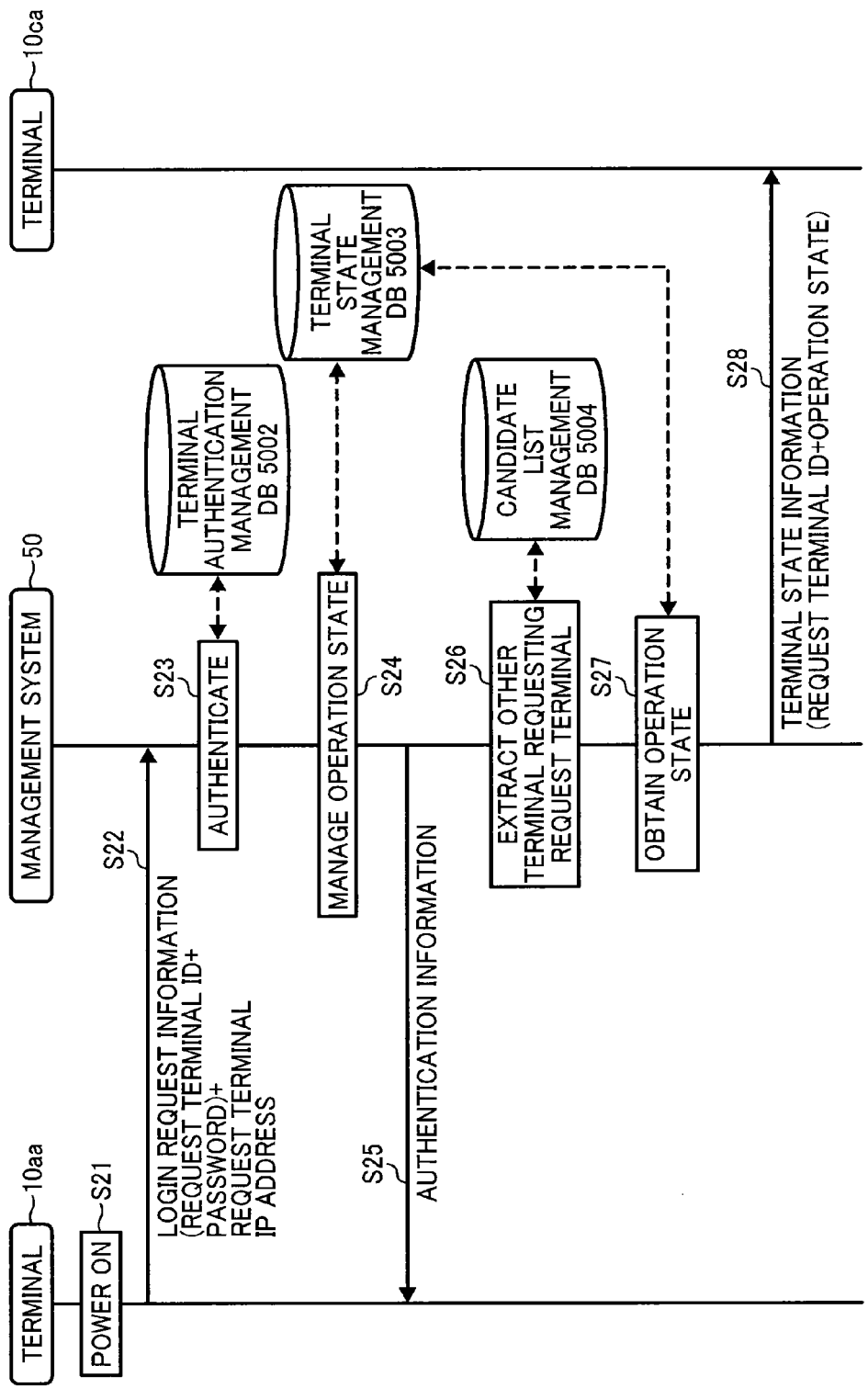
FIG. 15 is a data sequence diagram illustrating operation of preparing to start communication, in prior to establishing communication among two or more terminals of the communication system of FIG. 1, performed by the communication system of FIG. 1, according to an example embodiment of the present invention.

FIG. 15 is a data sequence diagram illustrating operation of preparing to start communication, performed by the communication system 1 of FIG. 1, according to an example embodiment of the present invention.

At S21, the request terminal 10aa receives a user input for turning on the power of the request terminal 10aa through the power switch 109 (FIG. 4). The operation input 12 (FIG. 8) of the request terminal 10aa turns on the power of the request terminal 10aa.

At S22, as the power of the request terminal 10aa is turned on, the data transmitter/receiver 11 of the request terminal 10aa automatically sends the login request information that requests the login process to the management system 50 through the communications network 2. The login request information includes a terminal ID that identifies the request terminal 10aa, and a password assigned to the request terminal 10aa. The terminal ID and the password may be obtained by the memory control 19 from the memory 1000, and sent to the data transmitter/receiver 11. At the time of sending the login request information from the request terminal 10aa to the management system 50, the request terminal 10aa sends an IP address of the request terminal 10aa such that the management system 50 can obtain the IP address of the request terminal 10aa. In alternative to the time at which the power is turned on, the request terminal 10aa may send the login request information at any time as instructed by the user. Further, the terminal ID and the password may be manually input by the user or read out from a removable memory provided by the user.

At S23, the terminal authenticator 52 of the management system 50 searches the terminal authentication management table (FIG. 11) stored in the memory 5000 using the terminal ID and the password of the login request information received through the data transmitter/receiver 51. When it is determined that the terminal ID and the password of the login request information is stored in the terminal authentication management DB 5002, the terminal authenticator 52 determines that the terminal 10aa is authenticated.

At S24, when the terminal authenticator 52 authenticates that the login request information is received from the authenticated terminal 10, the state manager 53 of the management system 50 stores the operation state, the date and time at which the login request information is received, and the IP address of the terminal 10aa, with respect to the terminal ID, the terminal type, and the terminal name of the terminal 10aa in the terminal state management table (FIG. 12) to create a record of the terminal 10aa. Using the terminal state management table of FIG. 12, which stores the operations state of online, the date and time of "13:40, 2/10/2013", and the terminal IP address of "1.2.1.3" in association with the terminal ID "01aa", the terminal type "communication terminal", and the terminal name "AA Terminal", various information regarding the terminal 10aa can be managed.

At S25, the data transmitter/receiver 51 of the management system 50 sends the authentication result obtained by the terminal authenticator 52 to the request terminal 10aa that has sent the login request information through the communications network 2. As described above, in this example, it is assumed that the terminal authenticator 52 determines that the terminal 10aa is an authenticated terminal.

At S26, the memory control 59 of the management system 50 searches the candidate list management table (FIG. 13) using the terminal ID "01aa" of the request terminal 10aa that has sent the login request information as a search key to extract a terminal ID of a terminal 10 that is previously registered for the request terminal 10aa having the terminal ID "01aa" as a candidate terminal. In this example, it is assumed that the terminal IDs extracted at S26 include the terminal IDs "01ab", "01ba", "01bb", "01ca", "01cb", "01da", and "02da".

At S27, the memory control 59 of the management system 50 searches the terminal state management table (FIG. 12) using the terminal ID "01aa" of the request terminal 10aa that has sent the login request information as a search key to obtain the operation state of the request terminal 10aa.

At S28, the data transmitter/receiver 51 of the management system 50 transmits the terminal state information including the terminal ID "01aa" of the request terminal 10aa and the operation state information indicating the operation state of the request terminal 10aa, to each one of the terminals 10 that are extracted. In this example, the data transmitter/receiver 51 sends the terminal state information, to the extracted terminal 10 that is determined to have the operation state "online", which is determined by the determiner 54. For example, assuming that the terminal 10ca receives the terminal state information, the terminal 10ca displays a candidate list that reflects the most updated operation state of the terminal 10aa on the display 120ca.

Figure 16:
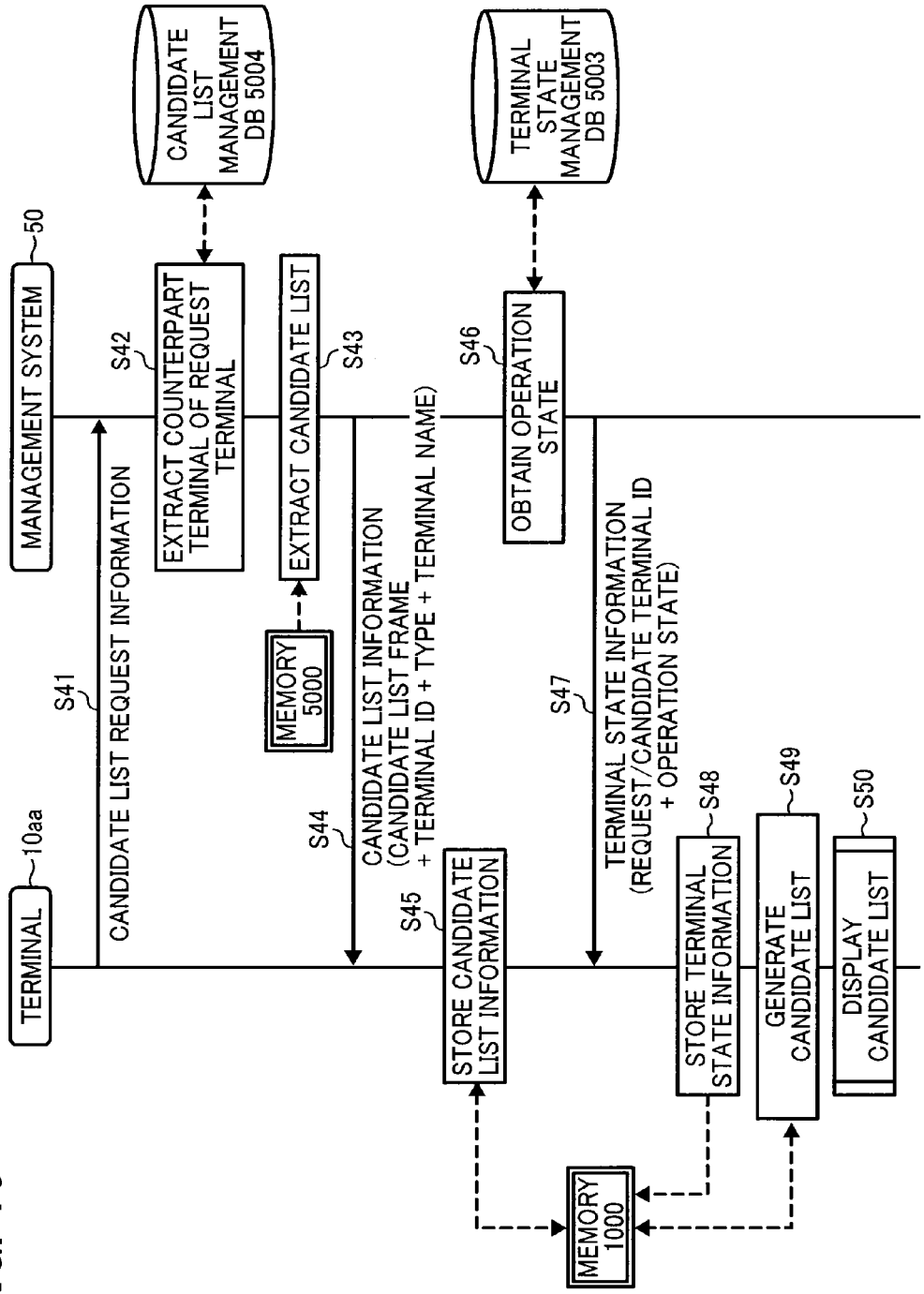
FIG. 16 is a data sequence diagram illustrating operation of displaying a candidate list, performed by the communication system of FIG. 1, according to an example embodiment of the present invention.

Referring now to FIGS. 16 and 17, operation of displaying a candidate list screen, performed by the communication system 1 of FIG. 1, is explained according to an example embodiment of the present invention. FIG. 16 illustrates operation of displaying a candidate list screen, performed after S25. FIG. 17 is an example candidate list screen, displayed at the request terminal 10aa.

Assuming that the authentication result indicating that the terminal 10aa is an authenticated terminal is received at S25 of FIG. 15, at S41 of FIG. 17, the data transmitter/receiver 11 of the request terminal 10aa sends candidate list request information that requests for a candidate list, to the management system 50 through the communications network 2. The data transmitter/receiver 51 of the management system 50 receives the candidate list request information.

At S42, the memory control 59 of the management system 50 searches the candidate list table (FIG. 13) using the terminal ID "01aa" of the request terminal 10aa that has sent the candidate list information as a search key to obtain a terminal ID of a candidate counterpart terminal 10 that is previously registered for the request terminal 10aa. The memory control 59 further searches the terminal state management table (FIG. 12) using the extracted terminal ID of the candidate counterpart terminal 10 as a search key to obtain the terminal type and the terminal name that are associated with the extracted terminal ID. For the descriptive purposes, it is assumed that the terminal IDs "01ab", "01ba", "01bb", "01ca", "01cb", "01da", and "02da" of the terminals 10 and the image forming apparatuses 20 are extracted as the terminal ID of the candidate counterpart terminal.

At S43, the memory control 59 of the management system 50 reads out the candidate list frame data from the memory 5000. At S44, the data transmitter/receiver 51 transmits the candidate list frame extracted at S43, the terminal ID of the candidate counterpart terminal (including the terminal 10 and the image forming apparatus 20) extracted at S42, and the terminal type and the terminal name of the candidate counterpart terminal (including the terminal 10 and the image forming apparatus 20) extracted at S42, to the request terminal 10aa, as the candidate list information. The data transmitter/receiver 11 of the request terminal 10aa receives the candidate list information.

At S45, the memory control 19 of the request terminal 10aa stores the candidate list information in the memory 1000.

In this manner, rather than causing each terminal 10 to manage the candidate list information, the management system 50 centrally manages the candidate list information for all of the terminals 10 and the image forming apparatuses 20 that are registered to the communication system 1. As the candidate list information is centrally managed at the management system 50, any change in the communication system 1 can be easily reflected in a timely manner without requiring the user at each terminal that could be a candidate counterpart terminal to change any settings. For example, the management system 50 is able to update the candidate list information to reflect when a new terminal 10 or a new image forming apparatus 20 is added to the communication system 1, when a new type of terminal 10 or image forming apparatus 20 is introduced to the communication system 1, or when the design for the candidate list frame is changed.

At S46, the memory control 59 of the management system 50 extracts the operation state of each one of the candidate counterpart terminals 10. The memory control 59 further extracts the operation state of each one of the image forming apparatuses 20.

At S47, the data transmitter/receiver 51 transmits the terminal state information, which includes the terminal ID and the operation state of each one of the candidate counterpart terminals 10, to the request terminal 10aa. More specifically, in this example, the data transmitter/receiver 51 transmits the terminal state information, which includes the candidate counterpart terminal ID that is used as the search key at S42 and the operation state of the candidate counterpart terminal 10, to the request terminal 10aa through the communications network 2. The data transmitter/receiver 51 further transmits the terminal ID and the operation state of each one of the image forming apparatuses 20, to the request terminal 10aa, as the terminal state information.

Alternatively, the data transmitter/receiver 51 may transmit the terminal state information, which includes the terminal ID of the request terminal 10aa and the operation state of the request terminal 10aa, to the request terminal 10aa, in addition to the terminal state information of the candidate counterpart terminal (including the terminal 10 and the image forming apparatus 20).

At S48, the memory control 19 of the request terminal 10aa stores the terminal state information regarding the candidate counterpart terminal 10 and the image forming apparatus 20, which is received from the management system 50, in the memory 1000. Based on the terminal state information regarding the candidate counterpart terminal, the request terminal 10aa is able to know the current operation state of the counterpart terminal 10 capable of communicating with the request terminal 10aa. Based on the terminal state information regarding the image forming apparatus, the request terminal 10aa is able to know the current operation state of the image forming apparatus 20 capable of receiving a print request from the request terminal 10aa.

At S49, the candidate list generator 18 of the request terminal 10aa generates a candidate list, which includes information that may be used to identify a counterpart communication terminal 10 for selection by the user. In this example, as illustrated in FIG. 17, the candidate list generator 18 generates the candidate list screen P20, which displays identification information of each candidate counterpart terminal 10, in association with information that reflects the operation state of the candidate counterpart terminal 10, based on the candidate list information and the terminal state information that are stored in the memory 1000. Since the candidate list screen P20 is to be displayed at the request terminal 10aa before starting communication, the candidate list generator 18 generates the candidate list, which only lists the candidate counterpart terminals 10 having the "communication terminal" type.

More specifically, the candidate list generator 18 refers to the terminal type information for each of the counterpart terminals that are indicated by the candidate list information, and extracts the counterpart terminals 10 having the communication terminal type as the candidate counterpart terminals 10 to be displayed. The candidate list generator 18 further refers to the terminal state information to obtain the visual information indicating the operation state of each of the candidate counterpart terminals 10 for display.

At S50, the display control 16 causes the display 120aa to display the candidate list screen P20 of FIG. 17. The candidate list screen P20 includes terminal-specific information P21, P22, and P23, etc. for the candidate counterpart terminals 10ab, 10ca, and 10da, etc. The terminal-specific information includes, for example, identification information for identifying each counterpart terminal, and visual information indicating the operation state of the counterpart terminal, in association with each other.

For example, the operation state of the candidate counterpart terminal 10 may be reflected on the terminal-specific information of the candidate list screen P20, as described below. The candidate list generator 18 searches the visual information management table (FIG. 9) based on the terminal type information and the operation state information of the candidate counterpart terminal, which is included in the terminal state information, to obtain the visual information associated with the terminal type and the operation state. The candidate list generator 18 associates, for each of the candidate counterpart terminals 10, the visual information with the terminal ID and the terminal name, such that the visual information, the terminal ID, and the terminal name are to be arranged within the candidate list frame in association with one another. In this example, the visual information is displayed in the form of icon. Assuming that the candidate list screen P20 of FIG. 17 is displayed, at least three icons of the candidate counterpart terminals 10 are displayed. Referring to FIG. 17, the icon of the terminal-specific information P21 indicates that the candidate counterpart terminal 10ab having the terminal ID "01ab" has the operation state "online, interrupt". The icon of the terminal-specific information P22 indicates that the candidate counterpart terminal 10ca having the terminal ID "01ca" has the operation state "offline". The icon of the terminal-specific information P23 indicates that the candidate counterpart terminal 10da having the terminal ID "01da" has the operation state "online, communication OK".

With this visual information, the user at the request terminal 10*aa* is able to instantly recognize the operation state of the candidate counterpart terminal 10, before starting communication with the candidate counterpart terminal 10. Further, since the request terminal 10*aa* only displays one or more candidate counterpart terminals 10 having the communication terminal type, the user at the request terminal 10*aa* can easily select one or more of the counterpart terminals 10 being displayed without the need for checking whether the counterpart terminal being displayed is a communication terminal 10 or an image forming apparatus 20.

The candidate list screen P20 further includes a "close" key P29 at the lower right of the screen P20, which, when selected, closes the candidate list screen P20.

Figure 18:
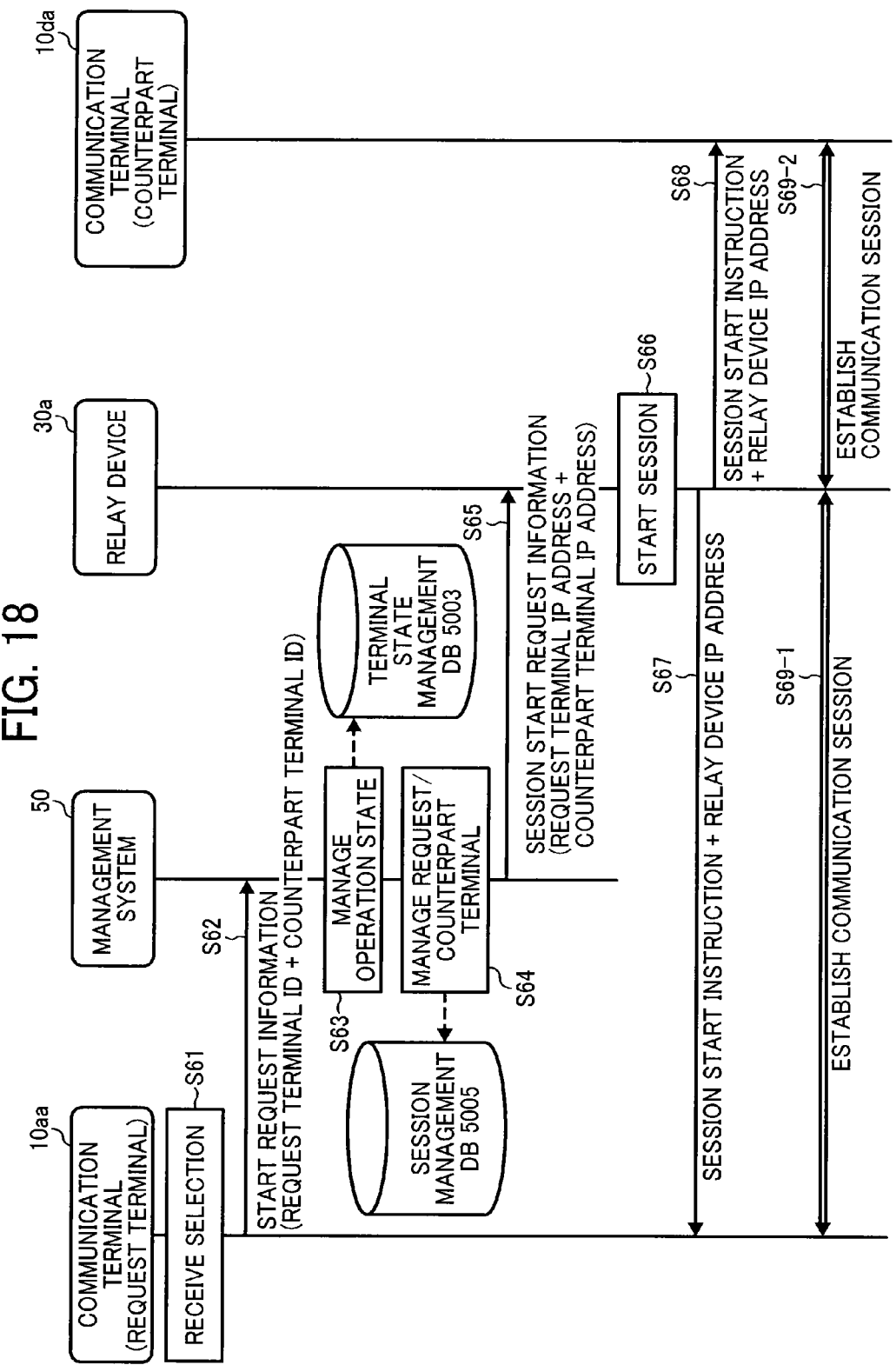
FIG. 18 is a data sequence diagram illustrating operation of establishing a communication session among two or more terminals of the communication system of FIG. 1, performed by the communication system of FIG. 1, according to an example embodiment of the present invention.

Referring now to FIG. 18, operation of establishing a communication session, to be ready for communication to be started between the terminal 10*aa* and the terminal 10*da*, performed by the communication system 1 of FIG. 1, is explained according to an example embodiment of the present invention.

At S61, the request terminal 10*aa* receives a user input that selects the terminal-specific information P23 of the candidate list screen P20 of FIG. 17 using the operation key 108 (FIG. 4). The operation input 12 (FIG. 8) receives a communication start request, which requests to start communication with the counterpart terminal 10*da*.

At S62, the data transmitter/receiver 11 of the request terminal 10*aa* sends communication start request information, which request to start communication, to the management system 50. The communication start request information includes the terminal ID "01aa" of the request terminal 10*aa* and the terminal ID "01da" of the counterpart terminal 10*da*. With this information, the data transmitter/receiver 51 of the management system 50 receives the IP address "1.2.1.3" of the request terminal 10*aa*.

At S63, the state manager 53 of the management system 50 specifies records in the terminal state management table (FIG. 12) stored in the terminal management DB 5003, which respectively correspond to the terminal ID "01aa" of the request terminal 10*aa* and the terminal ID "01da" of the counterpart terminal 10*da* to manage the specified records. More specifically, the state manager 53 changes the operation state field for the request terminal 10*aa* and the counterpart terminal 10*db*, from the "online (communication OK)" to "online (communicating)".

At S64, the session manager 55 of the management system 50 refers to the session management table (FIG. 14) stored in the memory 5000, to store the relay device ID "111a" of the relay device 30*a*, the terminal ID "01aa" of the request terminal 10*aa*, and the terminal ID "01da" of the counterpart terminal 10*da*, in association with one another. In this example, the relay device 30*a* is selected to relay contents data between the request terminal 10*aa* and the counterpart terminal 10*da*, as the relay device 30*a* has the IP address indicating the network location close to the location indicated by the IP address of the request terminal 10*aa*. Alternatively, the relay device 30*a* may be selected using the delay information managed using the session management table of FIG. 14, such as the delay time.

At S65, the data transmitter/receiver 51 of the management system 50 transmits session start (initiate) request information to the relay device 30*a*, to instruct the relay device 30*a* to start a communication session between the request terminal 10*aa* and the counterpart terminal 10*da*. The relay device 30*a* receives the session start request information. The session start request information includes the IP address "1.2.1.3" of the request terminal 10*aa* and the IP address "1.3.2.3" of the counterpart terminal 10*da*. The IP addresses may be obtained from the terminal state management table (FIG. 12), using the terminal ID of the request terminal 10*aa* and the terminal ID of the counterpart terminal 10*db* that are received at S62.

At S66, the relay device 30*a* starts (initiates) a session between the request terminal 10*aa* and the counterpart terminal 10*da*. For example, the relay device 30*a* generates a session ID for the session to be started.

At S67, the relay device 30*a* sends session start instruction information to the request terminal 10*aa*, using the IP address "1.2.1.3" of the request terminal 10*aa* that is received at S65. The session start instruction information instructs the request terminal 10*aa* to start a communication session with the relay device 30*a*. With this information, the IP address "1.2.1.2" of the relay device 30*a* is transmitted to the request terminal 10*aa*. Using the obtained IP address of the relay device 30*a*, the request terminal 10*aa* can establish a contents data communication session with the relay device 30*a*.

In a substantially similar manner, at S68, the relay device 30*a* sends session start instruction information to the counterpart terminal 10*da*, using the IP address "1.3.2.3" of the counterpart terminal 10*da* that is received at S65. The session start instruction information instructs the counterpart terminal 10*da* to start a communication session with the relay device 30*a*. With this information, the IP address "1.2.1.2" of the relay device 30*a* is transmitted to the counterpart terminal 10*da*. Using the obtained IP address of the relay device 30*a*, the counterpart terminal 10*da* can establish a contents data communication session with the relay device 30*a*.

At S69-1, the request terminal 10*aa* and the relay device 30*a* establish a first contents data communication session "sed1". At S69-2, the counterpart terminal 10*da* and the relay device 30*a* establish a second contents data communication session "sed2".

As the request terminal 10*aa* and the counterpart terminal 10*da* start communication, the display 120*aa* for the request terminal 10*aa* displays a communication screen P0 as illustrated in FIG. 19.

FIG. 19 illustrates the example case in which the request terminal 10*aa* communicates with the counterpart terminal 10*da*. The communication screen P0 of FIG. 19 includes a main screen P1 that displays an image of a user at the counterpart terminal 10*da*, and a sub-screen P2 that displays an image of a user at the request terminal 10*aa*. In one example, the main screen P1 is largest in area size, such that it displays the user who is currently speaking. The sub-screen P2 displays an image of the user who is not currently speaking. In another example, the main screen P1 may display the user of the counterpart terminal 10*da*, and the sub-screen P2 displays an image of the user at the request terminal 10*aa*. The communication screen P0 further includes a plurality of sub-screens P3 to P8 each of which is capable of displaying an image of a user at the other terminal 10 participating in the session. For example, when there is another communication terminal 10 that is participating in the session, the sub-screen P3 displays a user at the communication terminal 10.

The communication screen P0 further includes a message area P10, a "switch" key P11, a camera icon P12, and various other icons, at the lower section of the screen P0.

The message area P10, at the left, displays a message. The "switch" key P11 positioned at the center, when selected, switches an image between the main screen and the sub-screen.

The camera icon P12, at the right, indicates whether the camera 112 of the request terminal 10aa is turned on to capture an image to be transmitted, or whether the camera 112 of the request terminal 10aa is turned off to capture an image to be transmitted. More specifically, when the camera icon P12 is displayed with "X", the camera 112 is turned on, such that the user is able to turn off the camera 12 with selection of the camera icon P12. When the camera icon P12 is not displayed with "X", the camera 112 is turned off, such that the user is able to turn on the camera 12 with selection of the camera icon P12.

The communication screen P0 further includes a "capture" key P13, which, when selected, captures an image obtained by the request terminal 10aa and displayed on the sub-screen P2. More specifically, when the operation input 12 (FIG. 8) receives a user instruction for selecting the "capture" key P13, the capturing unit 14 captures an image being displayed on the sub-screen P2 (or any screen displaying the request terminal site) and stores image data in the memory 1000. For example, the user at the request terminal 10aa may display an image of presentation material for display to the user at the counterpart terminal 10da. In such case, the user at the counterpart terminal 10da may want to see a presentation material as a printed image. In response to such request, the user at the request terminal 10aa may select the "capture" key P13, while displaying the presentation material on the sub-screen P2, to cause the image forming apparatus 10 at the counterpart site to print an image of the presentation material.

Figure 20:
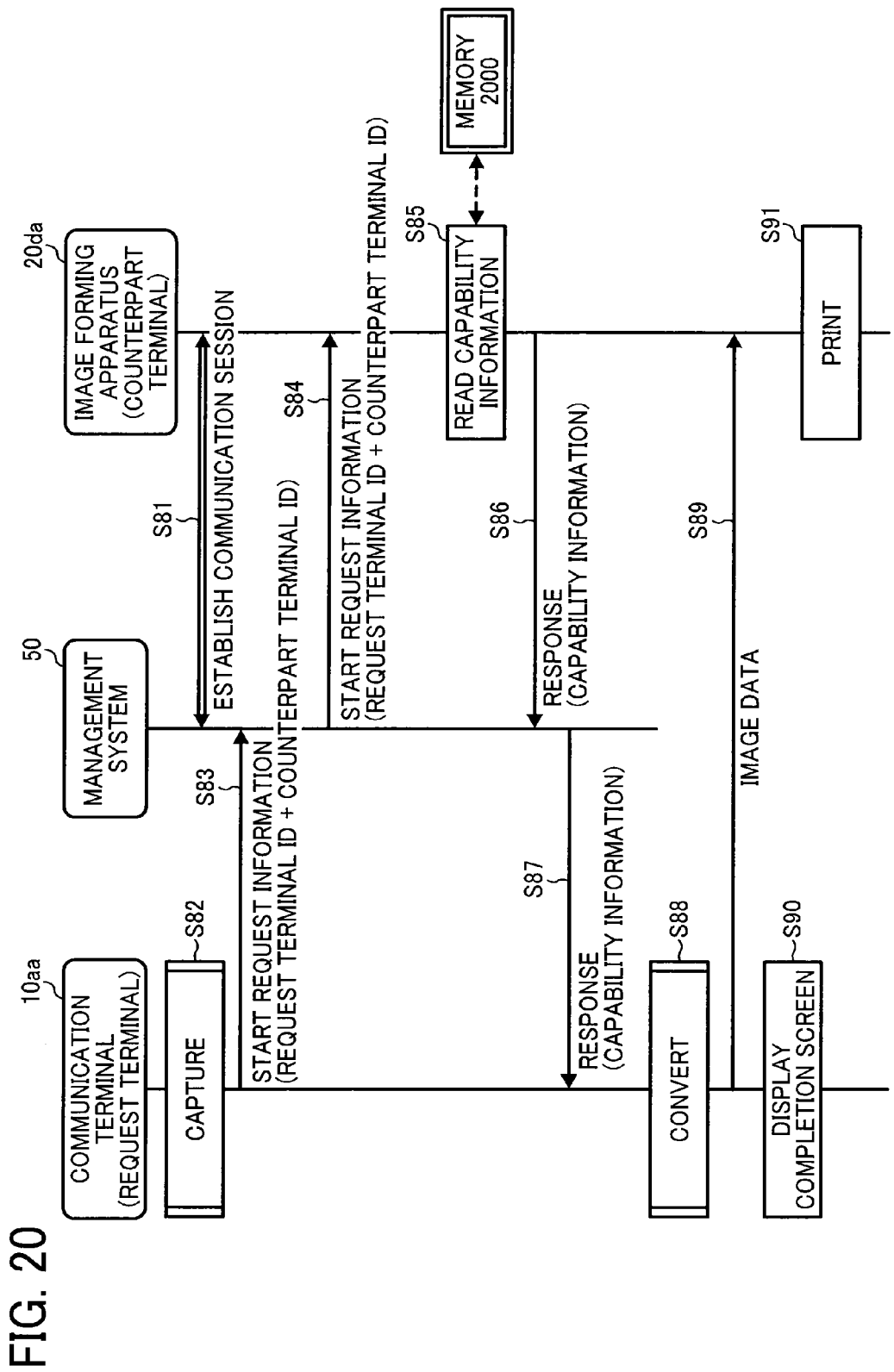
FIG. 20 is a data sequence diagram illustrating operation of transmitting image data from the communication terminal to the image forming apparatus of FIG. 8, according to an example embodiment of the present invention.

Referring now to FIGS. 20 to 27, operation of transmitting image data from the request terminal 10aa to the image forming apparatus 20da, during when the request terminal 10aa communicates with the counterpart terminal 10da, is explained according to an example embodiment of the present invention. FIG. 20 illustrates a data sequence diagram illustrating operation of transmitting image data from the request terminal 10aa to the image forming apparatus 20da.

At S81, as illustrated in FIG. 2, the image forming apparatus 20da establishes a management data communication session "sei" with the management system 50, for example, as the image forming apparatus 20da is turned on. The image forming apparatus 20da thus functions as one of communication terminals that can be managed by the management system 50. In this example, the management system 50 manages the operation state of the image forming apparatus 20da. More specifically, the management system 50 updates the terminal state management table of FIG. 12, by changing the operation state to "online".

In case the management system 50 manages the operation state of the image forming apparatus 20da using the four types of operation state information: online (communication OK), online (communicating or printing), online (interrupted), or offline, the image forming apparatus 20da transmits login request information to the management system 50 after S81 in a substantially similar manner as described above referring to S22. With the login request information, the management system 50 updates the terminal state management table of FIG. 12, by changing the operation state to "online (communication OK)".

Figure 21:
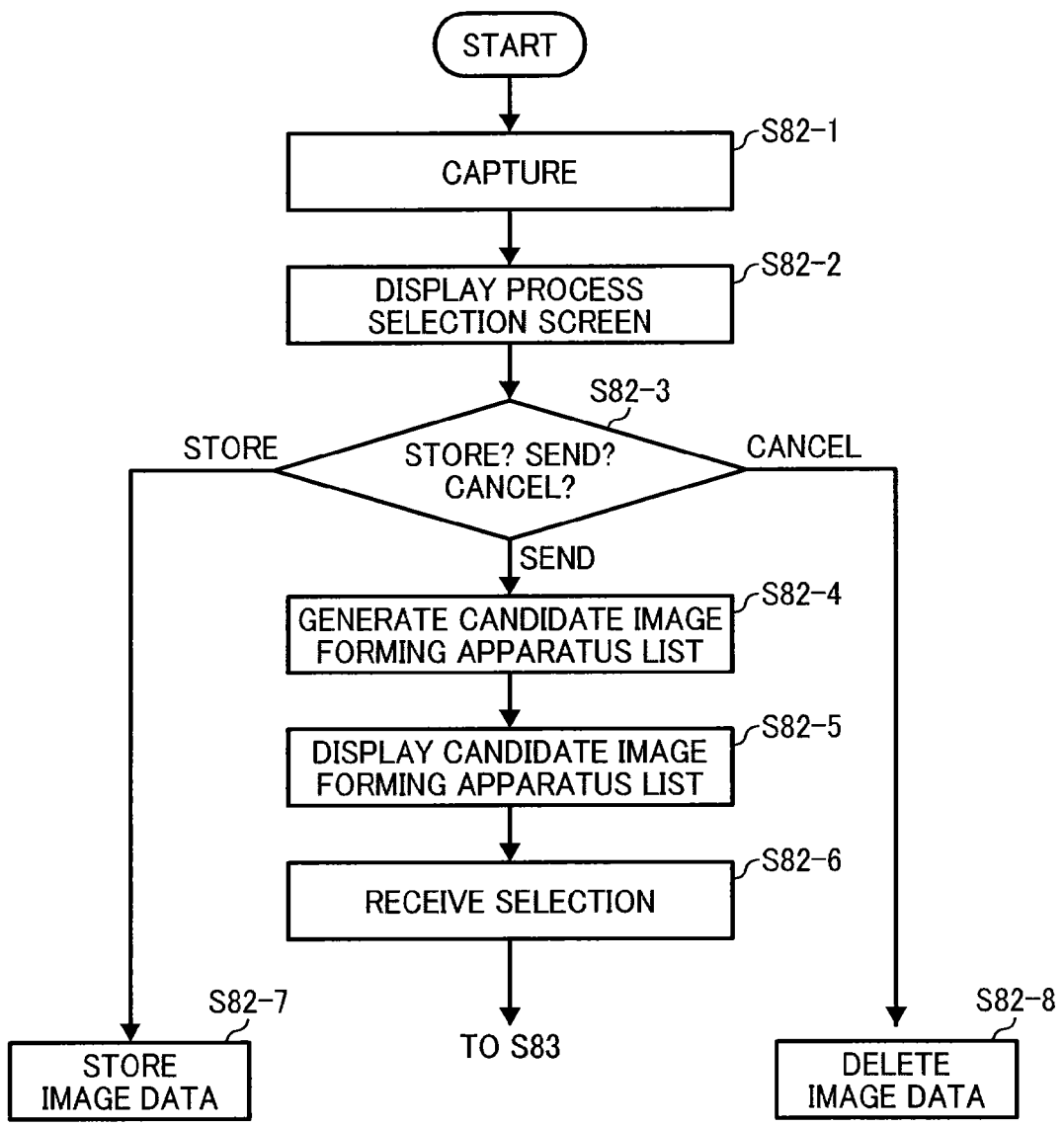
FIG. 21 is a flowchart illustrating operation of capturing image data, performed by the communication terminal of FIG. 8, according to an example embodiment of the present invention.

At S82, the request terminal 10aa captures an image, as described below referring to FIG. 21. FIG. 21 is a flowchart illustrating operation of capturing an image, performed by the request terminal 10aa, according to an example embodiment of the present invention. The operation of FIG. 21 is performed, when the operation input 12 (FIG. 8) receives a user instruction for selecting the "capture" key P13.

At S82-1, the capturing unit 14 captures an image being displayed on the sub-screen P2 of the communication screen P0 to obtain image data, and temporarily stores the image data in the memory 1000 such as the RAM 103 (FIG. 5).

Figure 22:
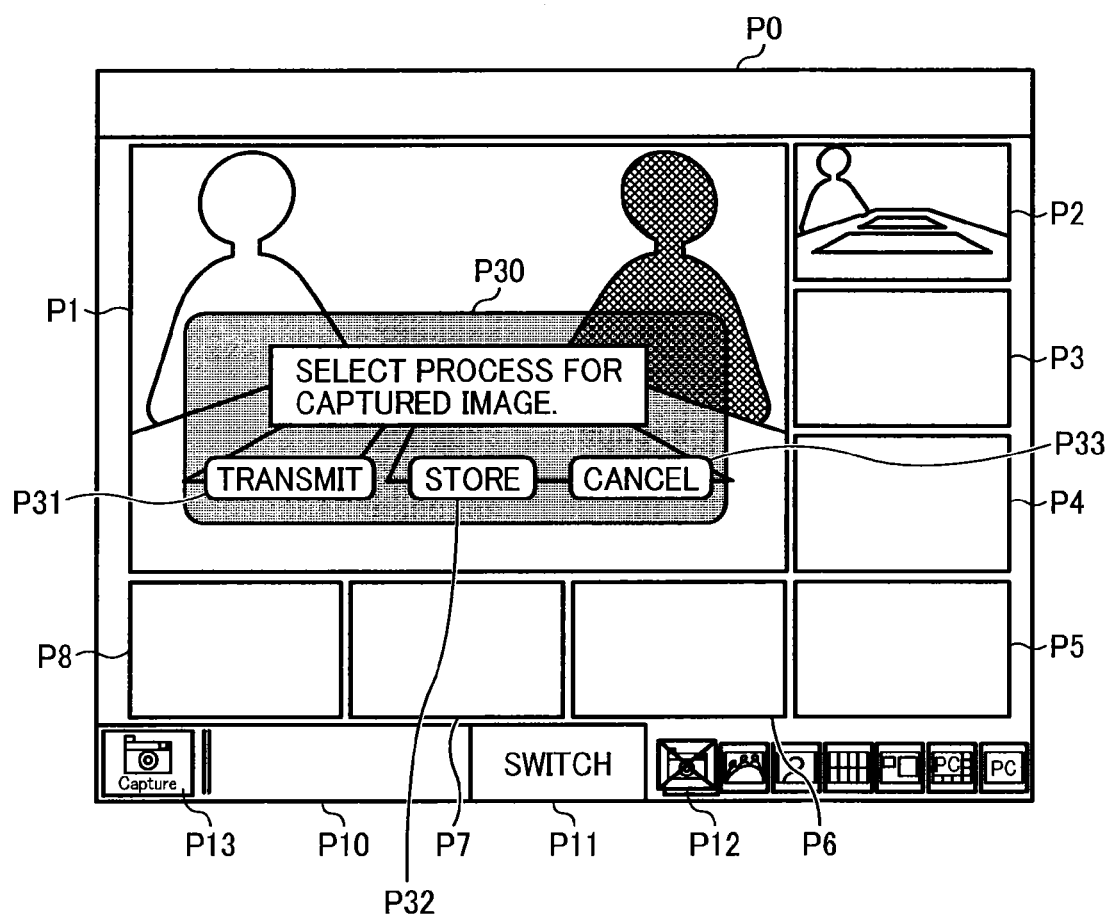
FIG. 22 is an illustration of an example process selection screen, displayed at the communication terminal of FIG. 8.

At S82-2, the display control 16 causes the display 10aa to display a process selection screen P30 in the form of pop-up window, with the communication screen P0, as illustrated in FIG. 22. FIG. 22 illustrates one example of process selection screen. The process selection screen P30 displays a message "Select process for captured image", a "transmit" key P31, a "store" key P32, and a "cancel" key P33. The "transmit" key P31, when selected, causes the request terminal 10aa to transmit the captured image data to a counterpart image forming apparatus 20 to be selected. The "store" key P32, when selected, causes the request terminal 10aa to store the captured image data, which is temporarily stored, in a memory. The "cancel" key P33, when selected, cancels further processing to be performed on the captured image data, such that the captured image data is not transmitted or stored.

At S82-3, the operation input 12 receives a user instruction through the process selection screen P30. When the user instruction for selecting the "transmit" key P31 is received ("send" at S82-3), the operation proceeds to S82-4. At S82-4, the candidate list generator 18 generates a candidate list, which lists one or more candidate image forming apparatuses 20 that the user can select. More specifically, in this example, the candidate list generator 18 generates a candidate list screen P40, which displays terminal-specific information for each one of the plurality of counterpart image forming apparatuses 20 while reflecting the operation state of the image forming apparatus 20, based on the candidate list information and the terminal state information that are stored in the memory 1000. Since the request terminal 10aa is communicating with the counterpart terminal 10da, the candidate list generator 18 generates terminal-specific information regarding the candidate terminal having the "image forming apparatus" type, that is, the image forming apparatus 20.

More specifically, the candidate list generator 18 refers to the terminal type information for each of the candidate counterpart terminals that are indicated by the candidate list information, and extracts the candidate image forming apparatus 20 having the image forming apparatus type as the candidate image forming apparatuses 20 to be displayed. The candidate list generator 18 further refers to the terminal state information to obtain the visual information indicating the operation state of each of the candidate image forming apparatuses 20 for display.

At S82-5, as illustrated in FIG. 23, the display control 16 causes the display 120aa to display the candidate list screen P40 in the form of pop-up window, with the communication screen P0. The candidate list screen P40 displays, for each one of the image forming apparatuses 20 that are extracted, terminal-specific information P41, P42, P43, and P44. The terminal-specific information includes, for example, identification information for identifying each candidate image forming apparatus, and visual information indicating the operation state of the candidate image forming apparatus, in association with each other. The candidate list screen P40 further includes a "close" key P45, which, when selected, closes the candidate list screen P40.

At S82-6, the operation input 12 receives a user instruction for selecting one of the image forming apparatuses 20, and the operation proceeds to S83 of FIG. 20. In this example, the user selects the image forming apparatus 20*da*, which is located at the site where the user at the counterpart terminal 10*da* is located.

At S82-3, when the operation input 12 receives a user instruction for selecting the "store" key P32 ("store" at S82-3), the operation proceeds to S82-7. At S82-7, the memory control 19 stores the captured image data in the memory 1000. More specifically, the memory control 19 stores the captured image data, which is temporarily stored in the RAM 103 (FIG. 5), in the flash memory 104 via the SSD 105. In such case, the operation ends without performing any further processing.

At S82-3, when the operation input 12 receives a user instruction for selecting the "cancel" key P33 ("cancel" at S82-3), the operation proceeds to S82-8. At S82-8, the memory control 19 deletes the captured image data, which is temporarily stored in the memory 1000. More specifically, the memory control 19 deletes the captured image data, which is temporarily stored in the RAM 103 (FIG. 5). In such case, the operation ends without performing any further processing.

Referring back to FIG. 20, at S83, the data transmitter/receiver 11 of the request terminal 10*aa* transmits communication start request information to the management system 50, to request for starting communication, in a substantially similar manner as described above referring to S62. The communication start request information includes the terminal ID "01aa" of the request terminal 10*aa*, and the terminal ID "02da" of the image forming apparatus 20*da* (counterpart terminal). The management system 50 receives the communication start request information at the data transmitter/receiver 51.

At S84, the data transmitter/receiver 51 of the management system 50 transmits communication start request information to the image forming apparatus 20*da* (counterpart terminal). The image forming apparatus 20*da*, which is the counterpart terminal, receives the communication start request information.

At S85, the memory control 29 of the image forming apparatus 20*da* reads out capability information from the memory 2000.

At S86, the data transmitter/receiver 21 transmits response information including the capability information to the management system 50, in response to the communication start request information received at S84. The management system 50 receives the response information at the data transmitter/receiver 51.

At S87, the data transmitter/receiver 51 of the management system 50 transmits the response information, received at S86, to the request terminal 10*aa* in response to the communication start request information received at S83. The request terminal 10*aa* receives the response information at the data transmitter/receiver 11.

Figure 24:
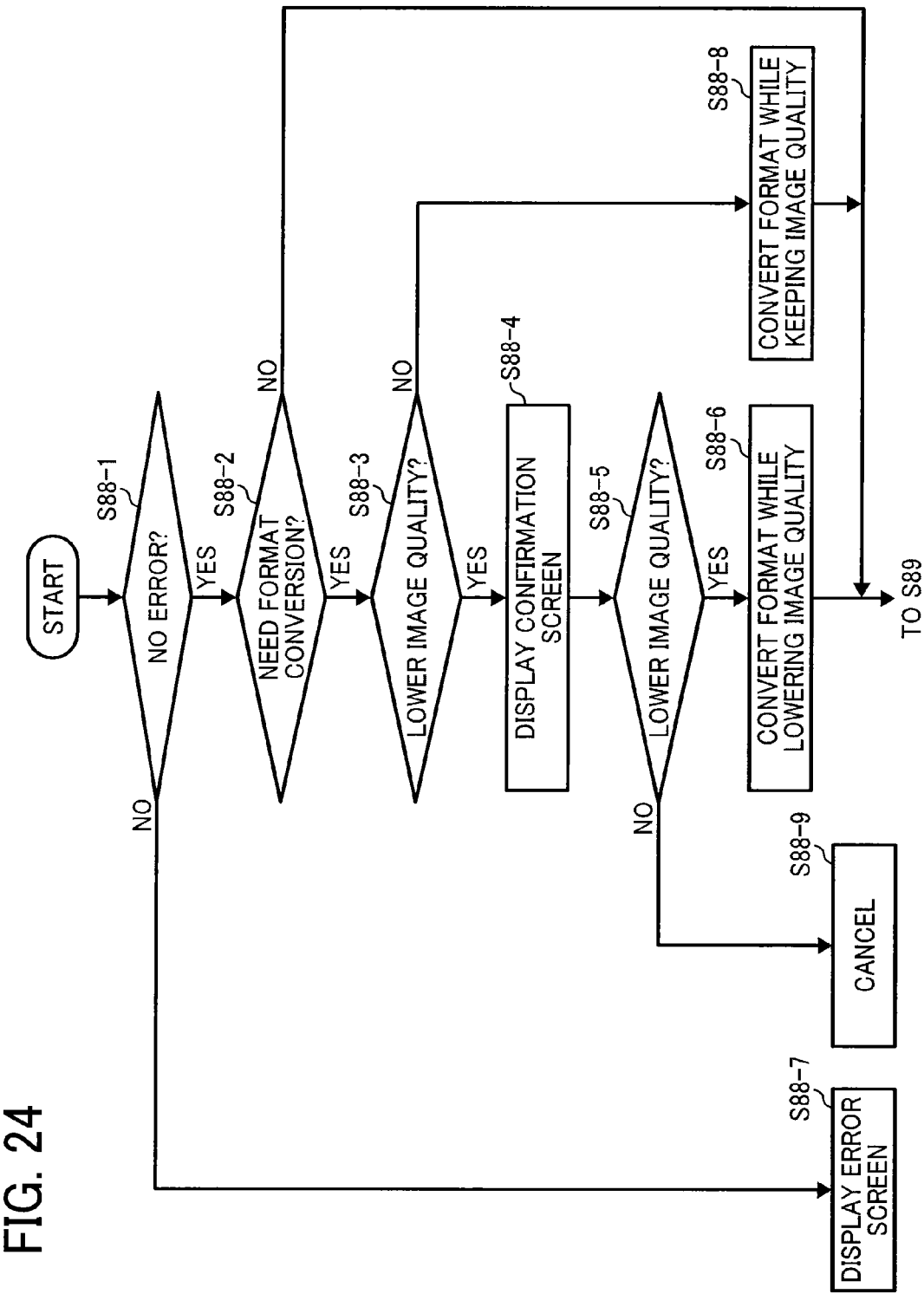
FIG. 24 is a flowchart illustrating operation of converting image data, performed by the communication terminal of FIG. 8, according to an example embodiment of the present invention.

At S88, the request terminal 10*aa* converts the captured image data to be transmitted to the image forming apparatus 20*da* (counterpart terminal). Referring to FIG. 24, operation of converting is explained according to an example embodiment of the present invention.

As illustrated in FIG. 24, at S88-1, the determiner 17*a* determines whether there will be no error based on the capability information. More specifically, when the image data to be transmitted from the request terminal 10*aa* has a data format printable by the image forming apparatus 20*da*, the determiner 17*a* determines that there will be no error in printing to be performed at the image forming apparatus 20*da*. More specifically, in this example, the case in which the determiner 17*a* determines that the data format is not printable by the image forming apparatus 20*da* includes the case in which the request terminal 10*aa* cannot convert the image data to have the data format printable by the image forming apparatus 20*da*.

When the image data to be transmitted from the request terminal 10*aa* has a data format not printable by the image forming apparatus 20*da*, the determiner 17*a* determines that there will be an error, and the operation proceeds to S88-7. When it is determined that there will be no error ("YES" at S88-1), the operation proceeds to S88-2.

At S88-2, the determiner 17*a* compares between a data format of the captured image data and a data format of image data printable by the image forming apparatus 20*da* that is indicated by the capability information. Based on comparison, the determiner 17*a* determines whether there is a need to convert the captured image data to be transmitted.

When it is determined that data format conversion is needed ("YES" at S88-2), the operation proceeds to S88-3. At S88-3, the determiner 17*a* determines whether image quality of the captured image data should be lowered, so that the captured image data can be printed by the image forming apparatus 20*da* as indicated by the capability information. For example, when the captured image data is 24-bit color image data, and the capability information indicates that the image forming apparatus 20*da* can only print a monochrome image, the determiner 17*a* determines that image quality should be lowered, such as from the 24-bit color image data to the monochrome image data.

Figure 25:
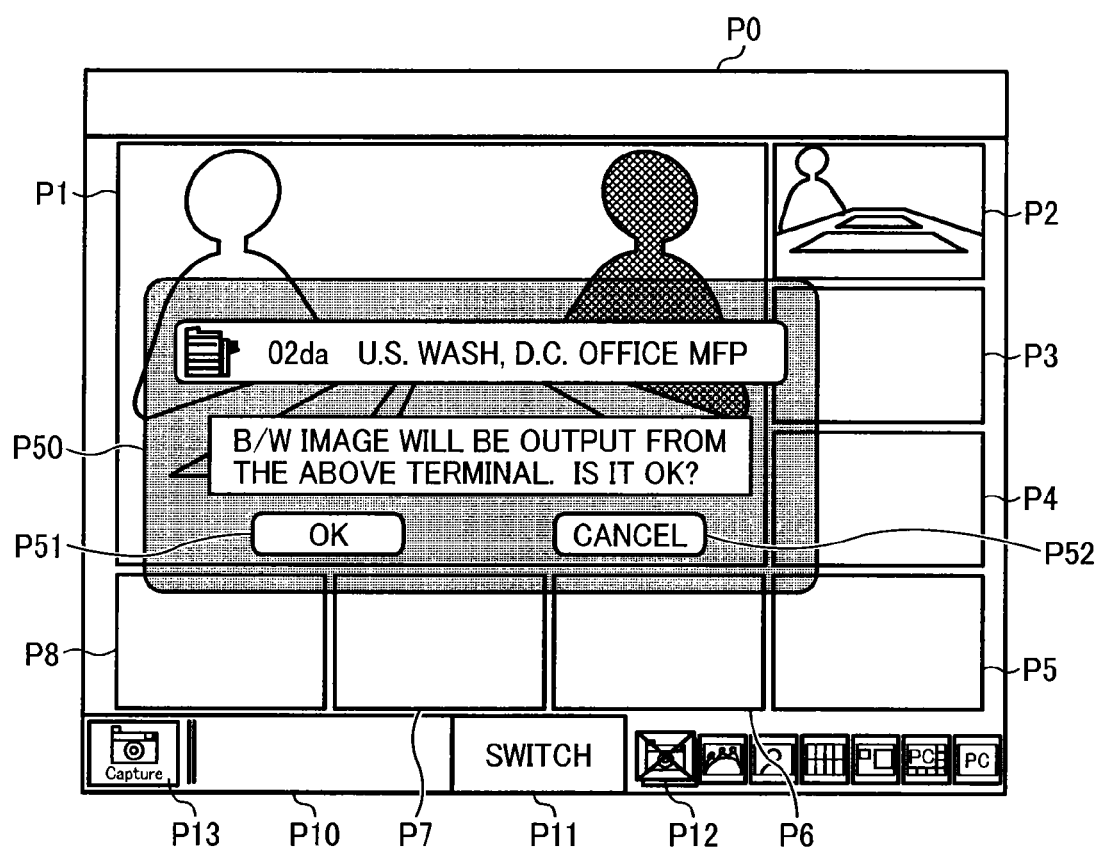
FIG. 25 is an illustration of an example confirmation screen, displayed at the communication terminal of FIG. 8.

When it is determined that image quality should be lowered at S88-3 ("YES" at S88-3), the operation proceeds to S88-4. As illustrated in FIG. 25, at S88-4, the display control 16 causes the display 120*aa* to display a confirmation screen P50 in the form of pop-up window, with the communication screen P0. FIG. 25 is an example confirmation screen. The confirmation screen P50 displays a message that asks if it is OK to send the captured image data to the selected image forming apparatus 20*da* (counterpart terminal) in monochrome image, a "OK" key P51, and a "cancel" key P52. The "OK" key P51, when selected, causes the request terminal 10*aa* to determine to send the captured image data after converting the data format. The "cancel" key P52, when selected, causes the request terminal 10*aa* to determine not to send the captured image data in the converted data format.

When the operation input 12 receives a user instruction for selecting the "OK" key P51 at S88-5 ("YES" at S88-5), the operation proceeds to S88-6. At S88-6, the converter 17*b* converts a data format of the captured image data, so that the captured image data have a data format printable by the image forming apparatus 20*da* as indicated by the capability information. While performing the data format conversion, the converter 17*b* lowers the image quality of the captured image data, so that the converted image data is printable by the image forming apparatus 20*da*. In this example, color image data is converted to monochrome image data. The operation further proceeds to S89 of FIG. 20.

Figure 26:
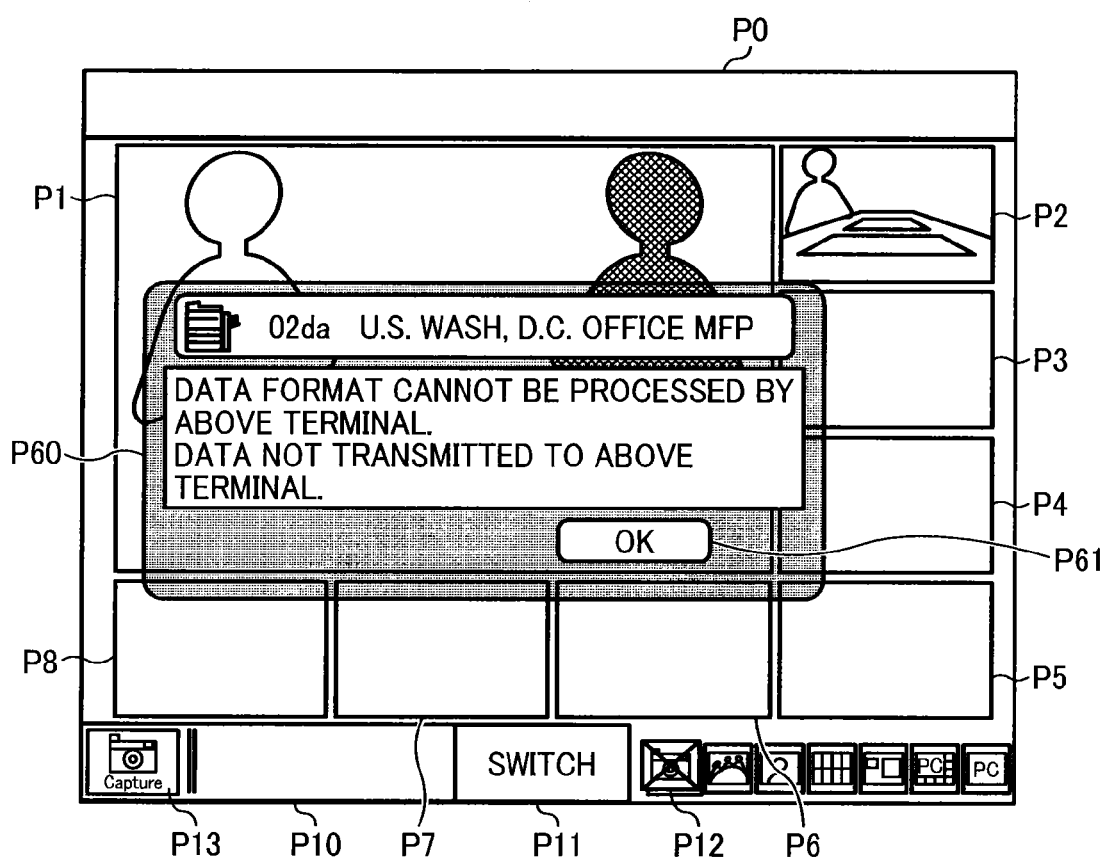
FIG. 26 is an illustration of an example error screen, displayed at the communication terminal of FIG. 8.

Referring back to S88-1, when it is determined that there will be an error ("NO" at S88-1), the operation proceeds to S88-7. As illustrated in FIG. 26, at S88-7, the display control 16 causes the display 120*aa* to display an error screen P60 in the form of pop-up window, with the communication screen P0. FIG. 26 illustrates an example error screen. The error screen P60 displays a message indicating that the captured image data is not transmitted to the selected image forming apparatus 20*da* (counterpart terminal), as the captured image data has a data format not printable by the selected image forming apparatus, and a "OK" key P61 to be selected by the user. In such case, the operation ends without transmitting the captured image data.

Referring to S88-2, when it is determined that data format conversion is not needed at S88-2 ("NO" at S88-2), the operation proceeds to S89 without performing S88-3 to 88-6.

When it is determined that image quality of the captured image data does not have to be lowered ("NO" at S88-3), the operation proceeds to S88-8. At S88-8, the converter 17*b* converts a data format of the captured image data to a data format printable by the image forming apparatus 10*da*, as indicated by the capability information, without lowering the image quality of the captured image data. Examples of such conversion include conversion to a printable data format, such as to a JPEG, PDF, PRCS, etc. The operation further proceeds to S89.

Referring to S88-5, when it is determined that the image quality is not to be lowered ("NO" at S88-5), the operation proceeds to S88-9 to cancel transmitting of the captured image data to the image forming apparatus 20*da*. In such case, the operation ends without transmitting the captured image data.

Referring back to FIG. 20, at S89, the data transmitter/receiver 11 of the request terminal 10*aa* transmits the captured image data to the image forming apparatus 20*da* (counterpart terminal), without intervening the management system 50 and the relay device 30*a*, through the communications network 2.

For example, the request terminal 10*aa* may store information regarding the IP address of the image forming apparatus 20 in a memory. Using the terminal ID of the image forming apparatus 20*da*, the request terminal 10*aa* may obtain the IP address of the image forming apparatus 20*da* to start communicating with the image forming apparatus 20*da*. Alternatively, the request terminal 10*aa* may obtain information regarding the IP address of the image forming apparatus 20*da*, from the management system 50.

Figure 27:
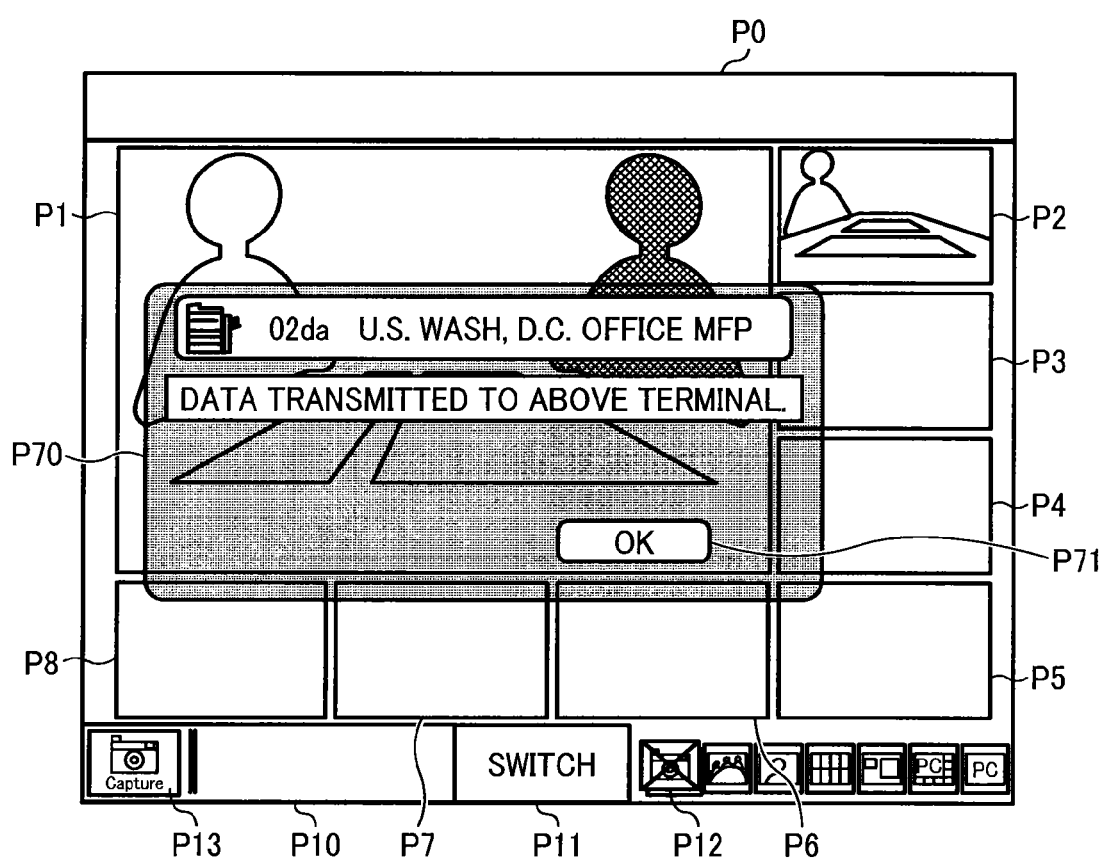
FIG. 27 is an illustration of an example completion screen, displayed at the communication terminal of FIG. 8.

At S90, as illustrated in FIG. 27, the display control 16 of the request terminal 10*aa* causes the display 120*aa* to display a completion screen P70 in the form of pop-up window, with the communication screen P0. FIG. 27 illustrates an example completion screen, displayed at the display 120*aa*. The completion screen P70 displays a message indicating that the captured image data is transmitted to the selected image forming apparatus 20*da*, and an "OK" key P71 to be selected by the user to indicate confirmation.

At S91, the image forming apparatus 20*da* prints an image based on the captured image data that is received at S89, on a recording sheet to output a printed image. Through operation of FIG. 20, the image data being captured at the request terminal 10*aa* is output through the image forming apparatus 20*da*, which is provided at the site where the counterpart terminal 10*da* is located, as a printed image for display to the user at the counterpart terminal 10*da*.

As described above, in the above-described example embodiment, the request terminal 10 is able to display information regarding one or more image forming apparatuses 20 that the request terminal 10 can send image data, while communicating with one or more counterpart terminals 10. In response to a user instruction for selecting the image forming apparatus 20, the request terminal 10 transmits image data to the selected image forming apparatus 20 through the communications network 2 without interrupting communication with the counterpart terminal 10. Even when the request terminal 10 is communicating with the one or more counterpart terminals 10, the request terminal 10 can easily transmit image data to the image forming apparatus 20 provided at a location where at least one of the counterpart terminal 10 is located.

In one example, as illustrated in FIG. 17, the request terminal 10 does not display information regarding the image forming apparatuses 20 when the request terminal 10 is not communicating with the counterpart terminal 10, for example, before the request terminal 10 selects the counterpart terminal 10 for communication. This prevents the user at the request terminal 10 to select the image forming apparatus 20 as the counterpart terminal to start communication by mistake. In another example, as illustrated in FIG. 23, the request terminal 10 does not display information regarding the candidate counterpart communication terminals 10 when the request terminal 10 is communicating with the counterpart terminal 10, for example, before the request terminal 10 selects the image forming apparatus 20 to which image data is transmitted. This prevents the user at the request terminal 10 to select the counterpart terminal 10 as the image forming apparatus 20 to transmit image data. More specifically, the request terminal 10 is able to distinguish between the communication terminal 10 and the image forming apparatus 20 by the terminal type information, which is received from the management system 50.

In the above-described example embodiments, the counterpart communication terminal 10 and the image forming apparatus 20 are both managed as a candidate of counterpart terminal that the request terminal 10 may start communication. In order to distinguish between the counterpart communication terminal 10 and the image forming apparatus 20, the terminal type information is used. In alternative to using the terminal type information, the management system 50 or the request terminal 10 may distinguish between the counterpart communication terminal 10 and the image forming apparatus 20 in various other ways.

Further, in one example, the request terminal 10 may be provided with function of displaying information regarding one or more candidate counterpart communication terminals 10, during when the request terminal 10 is communicating with the counterpart communication terminal 10, in response to a user instruction for displaying such information. In such case, the request terminal 10 may be caused to display terminal-specific information regarding one or more image forming apparatuses 20 available on the network, in response to a user instruction for capturing such as the user instruction that selects the "capture" key.

Further, terminal-specific information regarding one or more candidate counterpart terminals may be displayed in various other ways. In one example, when displaying information regarding the image forming apparatus 20 as a candidate counterpart terminal, the request terminal 10 may display the image forming apparatuses in a manner such that the user can easily select the image forming apparatus 20 that is closely located to the counterpart communication terminal 10 based on location information such as network address information. For example, the image forming apparatuses 20 may be listed in an order determined based on the degree of similarity in network address information between the image forming apparatus 20 and the counterpart communication terminal 10.

In one example, the request terminal 10 transmits the terminal ID for identifying the image forming apparatus 20, while communicating with the counterpart terminal 10. In response, the request terminal 10 receives capability information indicating the capability of the image forming apparatus 20 from the management system 50. The capability information may indicate a data format of image data that can be printable by the mage forming apparatus 20. Based on the capability information, the request terminal 10 converts image data to be transmitted, to have a data format printable by the image forming apparatus 20, and transmits the converted image data to the image forming apparatus 20. With this configuration, the user at the request terminal 10 does not have to determine whether to convert the image data based on the capability information of the image forming apparatus 20, as the image data is transmitted to the image forming apparatus 20 in a data format printable by the image forming apparatus 20.

The above-described communication terminal 10 is one example of communication apparatus capable of communicating with a counterpart communication apparatus. The other example communication apparatus includes a communication terminal capable of communicating with the counterpart communication terminal in realtime, using the chat function. In such case, the management system 50 of the communication system 1 is capable of communicating using the chat function.

In the above-described example embodiment, the communication terminal 10 is implemented by a videoconference terminal. The other examples of the communication terminal 10 include, but not limited to, personal computer, smart phone, tablet terminal, portable phone, and game machine. The camera 112 or the microphone 114 (FIG. 5) may not be incorporated in the terminal 10, such that any one of the camera 112 and the microphone 114 may be provided outside the terminal 10. The display 120 (FIG. 5), which is provided outside the terminal 10 in this example, may be incorporated in the terminal 10.

In the above-described example embodiment, the request terminal 10 displays the candidate list screen P20 with terminal-specific information P21 regarding the candidate communication terminal 10 as illustrated in FIG. 17. The request terminal 10 displays the candidate list screen P40 with terminal-specific information P41 regarding the candidate image forming apparatus 20 as illustrated in FIG. 23. Alternatively, the request terminal 10 may display a candidate list screen with terminal-specific information regarding the candidate communication terminal 10 and terminal-specific information regarding the candidate image forming apparatus 20, at any desired time.

In the above-described example embodiment, when the operation input 12 receives a user instruction for selecting the "capture" key P13, the capturing unit 14 of the request terminal 10 captures an image being displayed on the sub-screen P2 of the communication screen P0. Alternatively, any other image or at least a portion of any other image being displayed on the display 120 may be captured, such as the entire communication screen P0, the main screen P1, or both of the main screen P1 and the sub-screen P2.

In this example, the relay device 30, the management system 50, the program providing system 90, and the maintenance system 100 may each be implemented by a single computer. Alternatively, any number of parts, functions, or modules of the relay device 30, the management system 50, the program providing system 90, and the maintenance system 100 may be classified into a desired number of groups to be carried out by a plurality of computers. In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

A recording medium storing any one of the terminal control program, relay control program, and communication management program such as a CD-ROM, or a storage device such as the HDD 504 that stores any one of the programs, or the program providing system 90 provided with the HD 504 storing any one of the programs, may be distributed within the country or to another country as a computer program product.

In the above-described example embodiment, the terminal ID is used as identification information for identifying the terminal 10 or the image forming apparatus 20. In alternative to the terminal ID, user identification information for identifying a user at the terminal 10 or a user at the image forming apparatus 20 may be used.

Further, the date and time information stored in the relay device management table of FIG. 10 or the terminal state management table of FIG. 12, or the delay information stored in the session management table of FIG. 14 is expressed in terms of date and time. Alternatively, the date and time information or the delay information may be expressed only in terms of time such as the time at which information is received.

Further, in the above-described example embodiment, the IP address of any communication apparatus, which is managed using the terminal state management table (FIG. 12), is one example of address information for identifying a location on the communications network. The other examples of address information include, but not limited to, Fully Qualified Domain Name (FQDN). In such case, the communication system 1 is provided with a domain name system (DNS) server that obtains the IP address that corresponds to the FQDN of the relay device 30 or the terminal 10.

In the above-described example embodiment, the communication system 1 is implemented by a videoconference system. Alternatively, the communication system 1 of FIG. 1 may be implemented by a teleconference system such as the Internet Protocol (IP) or the Internet teleconference system, a chat system, or a whiteboard sharing system. Alternatively, the communication system 1 of FIG. 1 may be implemented as a car navigation system. For example, the request terminal 10 may be implemented as a car navigation system that is installed onto an automobile. The counterpart terminal 10 may be implemented as a management terminal or server at a management center that manages the car navigation system or a car navigation system that is installed onto another automobile. In another example, the communication system 1 of FIG. 1 may be implemented as a communication system having a portable phone. In such case, the terminal 10 is implemented as the portable phone.

Further, in the above-described examples, the communication system 1 is implemented as a videoconference system for use at offices. Other examples of use of the communication system 1 include, but not limited to, meetings, casual conversation among family members or friends, and distribution of information in one direction.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, ROM (read-only-memory), etc. Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In one example, the present invention may reside in a communication terminal capable of communicating with a counterpart terminal. The communication terminal includes a communication device that communicates with a counterpart communication terminal as a first counterpart terminal to transmit or receive contents data to or from the counterpart communication terminal. For example, the communication device may correspond to the data transmitter/receiver 11 of the communication terminal 10. The communication terminal further includes a processor that displays second-terminal-specific information regarding a second counterpart terminal on a display while keeping communication with the counterpart communication terminal being the first counterpart terminal. For example, the processor may correspond to a CPU, which operates in cooperation with a memory, to function as the display control of the communication terminal 10. The second-terminal-specific information includes, for each one of one or more image forming apparatuses that are available on the network, identification information that identifies the image forming apparatus as a candidate of the second counterpart terminal. In response to a user instruction that selects one of the image forming apparatuses as the second counterpart terminal using the identification information of the image forming apparatus, the communication device communicates with the selected image forming apparatus to transmit image data to the selected image forming apparatus through the network.

What is claimed is:

1. A communication terminal configured to communicate with a counterpart terminal through a network, comprising:
    a communication device configured to communicate with a counterpart communication terminal as a first counterpart terminal to transmit or receive contents data to or from the counterpart communication terminal; and
    a processor configured to display second-terminal-specific information regarding a second counterpart terminal on a display while keeping communication with the counterpart communication terminal being the first counterpart terminal,
        the second-terminal-specific information including, for each one of one or more image forming apparatuses that are available on the network, identification information that identifies the image forming apparatus as a candidate of the second counterpart terminal,
    wherein, in response to a user instruction that selects one of the image forming apparatuses as the second counterpart terminal using the identification information of the image forming apparatus, the communication device communicates with the selected image forming apparatus to transmit image data to the selected image forming apparatus through the network.

2. The communication terminal of claim 1, wherein the processor is further configured to display first-terminal-specific information regarding the first counterpart terminal on the display,
    the first-terminal-specific information including, for each one of one or more counterpart communication terminals that are available on the network, identification information that identifies the counterpart communication terminal as a candidate of the first counterpart terminal.

3. The communication terminal of claim 2, wherein the processor is further configured to
    select only the one or more counterpart communication terminals for display as the first-terminal-specific information, when the display is to display the first-terminal-specific information or the second-terminal-specific information before starting communication with the counterpart communication terminal, and
    select only the one or more image forming apparatuses for display as the second-terminal-specific information, when the display is to display the first-terminal-specific information or the second-terminal-specific information after starting communication with the counterpart communication terminal.

4. The communication terminal of claim 3, wherein
    the communication device is further configured to receive operation state information indicating an operation state of each one of the one or more candidates of counterpart terminal through the network, the counterpart terminal being at least one of the first counterpart terminal and the second counterpart terminal, and the processor is further configured to display, for each one of the one or more candidates of the counterpart terminal, information that visually reflects the operation state of the counterpart terminal in association with the identification information of the counterpart terminal, based on the operation state information.

5. The communication terminal of claim 1, wherein the processor is further configured to display a graphical image that allows a user to capture at least a part of an image being displayed on the display.

6. The communication terminal of claim 1, wherein the processor is further configured to capture at least a part of an image being displayed on the display in response to a user instruction, and transmit the captured image data to the selected image forming apparatus.

7. The communication terminal of claim 1, wherein the candidate of the second counterpart terminal is at least one of a copier, printer, facsimile, and multifunctional peripheral capable of performing a plurality of image processing functions including copying, printing, and facsimile transmission.

8. A communication method, comprising:

communicating with a counterpart communication terminal as a first counterpart terminal to transmit or receive contents data to or form the counterpart communication terminal through a network;

displaying second-terminal specific information regarding a second counterpart terminal on a display while keeping communication with the counterpart communication terminal being the first counterpart terminal, the second-terminal-specific information including, for each one of one or more image forming apparatuses that are available on the network, identification information that identifies the image forming apparatus as a candidate of the second counterpart terminal, receiving a user instruction that selects one of the image forming apparatuses as the second counterpart terminal using the identification information of the image forming apparatus; and communicating with the selected image forming apparatus to transmit image data to the selected image forming apparatus through the network.

9. The communication method of claim 8, further comprising:

displaying first-terminal-specific information regarding the first counterpart terminal on the display, the first-terminal-specific information including, for each one of one or more counterpart communication terminals that are available on the network, identification information that identifies the counterpart communication terminal as a candidate of the first counterpart terminal.

10. The communication method of claim 9, further comprising:

selecting only the one or more counterpart communication terminals for display as the first-terminal-specific information, when the displaying is to be performed before starting communication with the counterpart communication terminal, and selecting only the one or more image forming apparatuses for display as the second-terminal-specific information, when the displaying is to be performed after starting communication with the counterpart communication terminal.

11. The communication method of claim 10, further comprising:

receiving operation state information indicating an operation state of each one of the one or more candidates of counterpart terminal through the network, the counterpart terminal being at least one of the first counterpart terminal and the second counterpart terminal, and displaying, for each one of the one or more candidates of the counterpart terminal, information that visually reflects the operation state of the counterpart terminal in association with the identification information of the counterpart terminal, based on the operation state information.

12. The communication method of claim 8, further comprising:

displaying a graphical image that allows a user to capture at least a part of an image being displayed on the display.

13. The communication method of claim 8, further comprising:

capturing at least a part of an image being displayed on the display in response to a user instruction, and transmitting the captured image data to the selected image forming apparatus.

14. A non-transitory recording medium storing a plurality of instructions which, when executed by a processor, cause the processor to perform a communication method comprising:

communicating with a counterpart communication terminal as a first counterpart terminal to transmit or receive contents data to or form the counterpart communication terminal through a network;

displaying second-terminal specific information regarding a second counterpart terminal on a display while keeping communication with the counterpart communication terminal being the first counterpart terminal, the second-terminal-specific information including, for each one of one or more image forming apparatuses that are available on the network, identification information that identifies the image forming apparatus as a candidate of the second counterpart terminal, receiving a user instruction that selects one of the image forming apparatuses as the second counterpart terminal using the identification information of the image forming apparatus; and communicating with the selected image forming apparatus to transmit image data to the selected image forming apparatus through the network.

* * * * *